(12) United States Patent
Takahashi

(10) Patent No.: US 8,599,426 B2
(45) Date of Patent: Dec. 3, 2013

(54) APPARATUS FOR STORING AND MAINTAINING PRINTING-ASSOCIATED INFORMATION UPDATED DURING THE OPERATION OF THE PRINTING APPARATUS IN A NON-VOLATILE STORAGE UNIT

(75) Inventor: Hayato Takahashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 169 days.

(21) Appl. No.: 13/219,200

(22) Filed: Aug. 26, 2011

(65) Prior Publication Data

US 2012/0050812 A1 Mar. 1, 2012

(30) Foreign Application Priority Data

Aug. 30, 2010 (JP) ................. 2010-191835

(51) Int. Cl.
*G06K 15/00* (2006.01)
(52) U.S. Cl.
USPC ........................................................ 358/1.16
(58) Field of Classification Search
USPC ........................................................ 358/1.16
See application file for complete search history.

(56) References Cited

U.S. PATENT DOCUMENTS 6,196,670 B1 3/2001 Saruta

FOREIGN PATENT DOCUMENTS

| JP | 2003-019818 A | 1/2003 |
|----|---------------|--------|
| JP | 2005-193593 A | 7/2005 |
| JP | 2007-287022 A | 11/2007 |

*Primary Examiner* — Eric A Rust
(74) *Attorney, Agent, or Firm* — Maschoff Brennan

(57) ABSTRACT

A writing-back task unit alternately performs writing-back of data of a second storage unit in two storage areas of a non-volatile memory according to a flag value of an updating flag. At this time, a counting process of a counter for obtaining a count value according to written-back data amount is performed. At a power-on time, it is determined whether or not all the counters have writing-back completion values. When all the counters have the writing-back completion values, if the updating flag=1, the data of the first storage area are written in a first storage unit of a RAM. On the other hand, if the updating flag=0, the data of the second storage area are written in the first storage unit of the RAM.

20 Claims, 14 Drawing Sheets

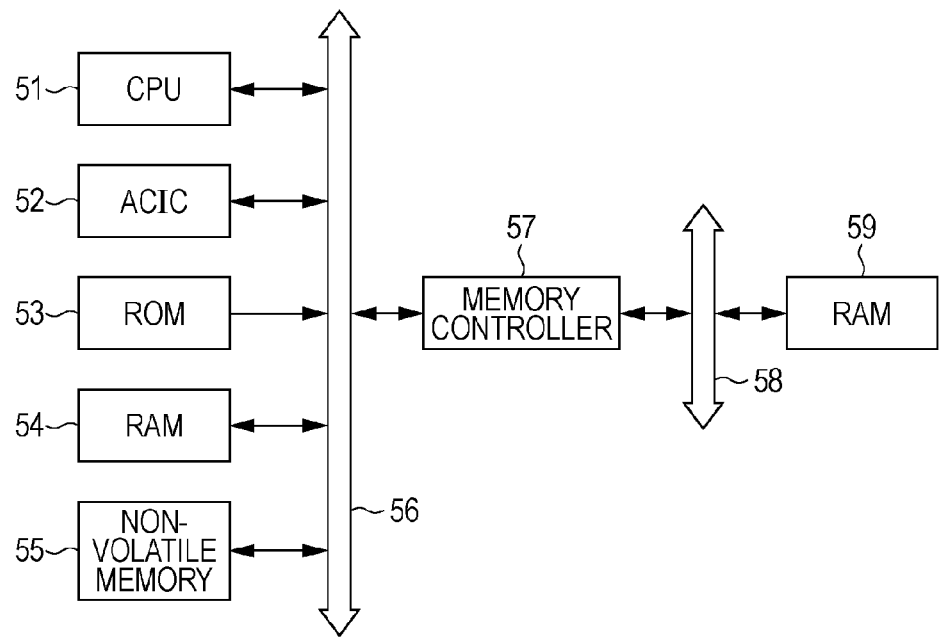

APPARATUS FOR STORING AND MAINTAINING PRINTING-ASSOCIATED INFORMATION UPDATED DURING THE OPERATION OF THE PRINTING APPARATUS IN A NON-VOLATILE STORAGE UNIT

CROSS REFERENCES TO RELATED APPLICATIONS

The entire disclosure of Japanese Patent Application No. 2010-191835, filed Aug. 30, 2010 is expressly incorporated herein by reference.

BACKGROUND

1. Technical Field

The present invention relates to a data storage processing apparatus operable in a printing apparatus. The data storage processing apparatus stores and maintains data including printing-associated information updated during the operation of the printing apparatus in a non-volatile storage unit. The present invention also relates to a printing apparatus and a data storage processing method.

2. Related Art

Japanese Patent Documents JP-A-2005-193593 and JP-A-2003-19818 disclose printing apparatuses which store data such as ink remaining amount information in a non-volatile memory.

For example, the recording apparatus disclosed in JP-A-2005-193593 includes a first non-volatile memory mounted on a recording head and a second non-volatile memory mounted on an ink tank, and a technique of copying contents of the second non-volatile memory mounted on the ink tank into the first non-volatile memory mounted on the recording head is disclosed. At the printing ending time, the recovery operation completion time, or the like, where an operation is performed where ink consumed, the contents of the second non-volatile memory of the ink tank and the contents of the first non-volatile memory of the recording heads are simultaneously rewritten. Therefore, although the rewriting of the data into the second non-volatile memory of the ink tank fails due to an accidental manipulation such as detachment of the ink tank during the data writing, the contents of the second non-volatile memory of the ink tank may be recovered by using the contents of the first non-volatile memory of the recording head.

In addition, JP-A-2003-19818 discloses a printing apparatus which calculates an ink remaining amount when one-page printing is completed and then writes the calculated ink remaining amount back to a non-volatile memory (EEPROM). Next, when a power down command is output, the data of the ink remaining amount in the non-volatile memory are written in a non-volatile storage device of an ink cartridge.

However, since the writing-back of the data from the RAM or the non-volatile memory into another non-volatile memory (non-volatile storage device) is performed at the power-off time, when electricity failure occurs or a power plug is unplugged, the writing-back process is necessarily completed in a short time (for example, a discharging time of a condenser having a secondary battery function) until the power is shutdown. In this case, a problem where the writing-back of the data is not completely performed so that old data is mixed in a portion of the non-volatile memory.

In this manner, in the case of the configuration using a non-volatile memory such as an EEPROM of which the writable number is limited, when the power down command is output, the writing-back of the data is limited to the case of the ink cartridge replacement time or the like. Therefore, the aforementioned problem occurs. Recently, a non-volatile memory such as an FeRAM having a durability so that there is substantially no limitation in the writable number has also been used. In these cases, updated data such as ink remaining amount sequentially updated are stored in an RAM, so that it is possible to write the data in the non-volatile memory with a writing frequency lower which is than that of the RAM.

However, at the accidental power shutdown time, when the writing-back of the data from a storage unit (second storage unit) which is one of the RAM, the non-volatile memory, and the like to another storage unit (first storage unit) constructed with a non-volatile memory is performed, the power supplying is prematurely stopped, so that the writing-back process of the data from the second storage unit to the first storage unit may be halted during the process. In this case, there is a problem in that the data where new data up to the stopping of the writing-back are incorrectly connected to the previous-time old data, of which the updating is not completed through the writing-back, are stored in the non-volatile memory. For example, when the boundary between the new and old data is corresponds to a single piece of one information, the information becomes incorrect.

If the power is shutdown in the state where incorrect data is stored in the non-volatile memory (first storage unit), there may be difficulties at the next power-on time, wherein, for example, the ink remaining amount information acquired based on the incorrect data read from the non-volatile memory may be different from the actual ink remaining amount. In this case, there is a problem in that the ink remaining amount information may indicate that there is ink remaining in the apparatus although there is not actually any ink remaining, so that ink disconnections are formed during the printing. Other problems may occur when there is ink remaining in the apparatus although the memory indicates that there is no ink remaining, so that the printing operation is forcibly stopped or an error occurs. It goes without saying that, since various data as well as the ink remaining amount are stored in the non-volatile memory (first storage unit), problems occurring due to the incorrect data differ according to the type of the data.

BRIEF SUMMARY OF THE INVENTION

An advantage of some aspects of the invention is to provide a data storage processing apparatus in a printing apparatus capable of writing correct data, of which writing-back is completed, from a first storage unit into a second storage unit and capable of writing relatively new data, of which writing-back is completed, in the second storage unit even when a writing-back process is stopped. Other aspects of the invention involve a printing apparatus and a data storage processing method which provide similar benefits.

A first aspect of the invention is a data storage processing apparatus for use in a printing apparatus. The data storage processing apparatus includes a printing control unit which controls the printing unit and acquires printing-associated information updated through an operation of the printing unit, a non-volatile first storage unit including a plurality of storage units in which data including the printing-associated information are stored, a second storage unit in which the data of the storage units are written, a writing unit which writes the data of the storage units in the second storage unit; a second storage unit in which the printing-associated information acquired by the printing control unit is written, a plurality of counting units which are disposed to correspond to the plurality of the storage units, and a writing-back unit which performs a writing-back process for writing the data of the second storage unit back to the plurality of the storage units and performs counting processes of the counting unit corresponding to the storage units of the writing-back sites to set a count value according to an amount of the written-back data. The writing unit writes the data of the storage unit corresponding to the counting unit, of which the count value becomes a writing-back completion value, among the plurality of the counting units in the second storage unit.

According to the aspect of the invention, the data of the storage units of the first storage unit are written in the second storage unit by the writing unit. The printing control unit controls the printing unit to acquire the printing-associated information updated through the operation of the printing unit and updates the data by writing the acquired printing-associated information in the second storage unit. The writing-back unit performs the writing-back process for writing the data of the second storage unit back to the plurality of storage units of the first storage unit. At this time, the counting process of the counting unit corresponding to the storage unit of the writing-back site is performed, so that the count value according to the written-back data amount is obtained. As a result, the data of the second storage unit are written in each of the plurality of storage units. After that, when the writing unit performs writing, the data of the storage unit corresponding to the counting unit of which the count value becomes the writing-back completion value among a plurality of counting units are written in the second storage unit. In other words, even when a storage unit of which the writing-back is stopped, it is possible to avoid a problem in that the data are written in the second storage unit during the writing-back of the storage unit. Accordingly, it is possible to write correct data of which the writing-back is completed from the first storage unit into the second storage unit, and furthermore, even when the writing-back process is stopped, it is possible to write relatively new data of which the writing-back is completed in the second storage unit.

According to another aspect of the invention, there is provided a printing apparatus including a printing unit, and a control unit which controls the printing unit, wherein the control unit includes the data storage processing apparatus according to the above-described aspect of the invention.

According to the aspect of the invention, since the printing apparatus includes the data storage processing apparatus according to any one of the aforementioned aspects of the invention, it is possible to obtain the effect of any one of the aspects of the invention associated with the data storage processing apparatus.

According to still another aspect of the invention, there is provided a data storage processing method of a printing apparatus, wherein the printing apparatus includes a first storage unit including a plurality of storage units which store data including printing-associated information; and a second storage unit which permits a printing control unit to perform writing access of the data in order to write data of the storage units and to update the data. The data storage processing method includes writing the data of the storage units of the first writing unit in the second storage unit, controlling a printing unit and acquiring the printing-associated information which is updated through an operation of the printing unit, updating data by writing the printing-associated information, which is acquired in the acquiring the printing-associated information, in the second storage unit, and performing a writing-back process of writing the data of the second storage unit back to the plurality of the storage units and obtaining count values according to the written-back data amount by performing a counting process of the counting unit corresponding to the storage unit of a writing-back site. In the writing of the data of the storage units of the first writing unit in the second storage unit, determining whether or not the count value is a writing-back completion value and writing data of the storage unit corresponding to the counting unit, of which the count value becomes the writing-back completion value among the plurality of the counting units, in the second storage unit. According to the aspect of the invention, it is possible to obtain the same functions and effects as those of the data storage processing apparatus according to the aspect of the invention.

BRIEF DESCRIPTION OF THE DRAWINGS

The invention will be described with reference to the accompanying drawings, wherein like numbers reference like elements.

FIG. 4 is a block diagram illustrating a hardware configuration of the controller;

FIGS. 5A and 5B are schematic diagrams illustrating a task priority management table;

DESCRIPTION OF EXEMPLARY EMBODIMENTS

Hereinafter, a printing control unit in a lateral type ink jet printer according to an embodiment of the invention will be described with reference to FIGS. 1 to 12.

Figure 1:
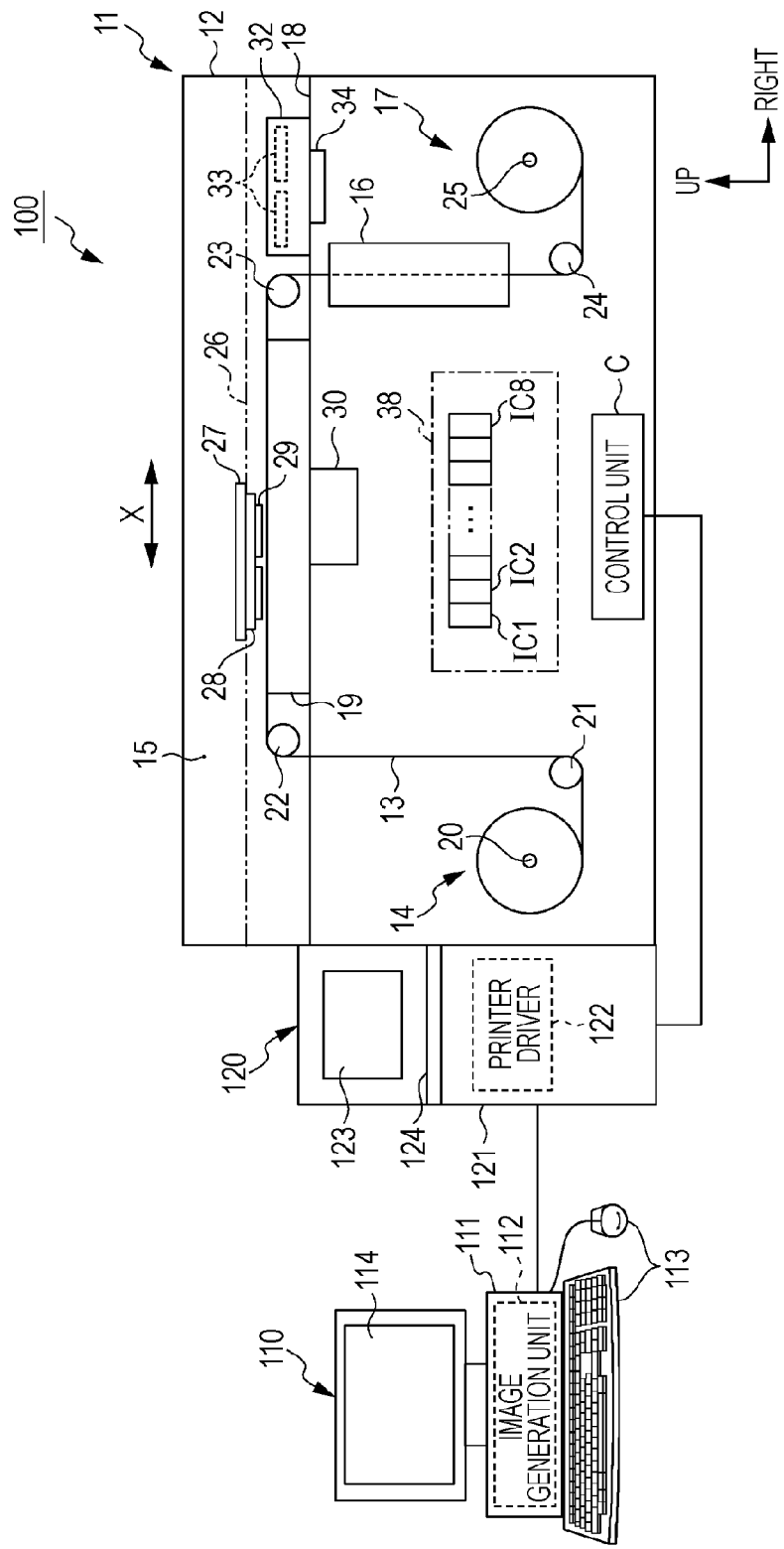
FIG. 1 is a schematic side diagram illustrating a printing system according to a first embodiment.

FIG. 1 is a schematic diagram illustrating a printing system having a lateral type ink jet printer. As illustrated in FIG. 1, a printing system 100 includes an image generation apparatus 110 which generates image data, a host apparatus 120 as an example of a higher-level apparatus which generates printing data based on the image data received from the image generation apparatus 110, and a lateral type ink jet printer (hereinafter, simply referred to as a "printer 11") as an example of a printing apparatus which prints an image based on the printing data received from the host apparatus 120.

The image generation apparatus 110 is configured as, for example, a personal computer and includes an image generation unit 112 which is configured so that a CPU in a main body 111 thereof executes image generation software. A user activates the image generation unit 112 to generate an image on a monitor 114 through a manipulation of an input unit 113 and commands image printing through a manipulation of the input unit 113. Therefore, image data associated with the image are transmitted through a predetermined communication interface to the host apparatus 120.

The host apparatus 120 is configured as, for example, a personal computer and includes a printer driver 122 which is configured so that a CPU of a main body 121 thereof executes printer driver software. The printer driver 122 generates printing data based on the image data received from the image generation apparatus 110 and transmits the printing data to a control unit C disposed in the printer 11. The control unit C controls the printer 11 based on the printing data received from the printer driver 122 and allows the printer 11 to print an image based on the printing data. In addition, a menu screen for inputting and setting control setting values in the printer 11, an image of a printing object, or the like is displayed on the monitor 123.

Next, a configuration of the printer 11 illustrated in FIG. 1 is described. In addition, hereinafter, in the description in the specification, "leftward and rightward directions" and "upward and downward directions" are indicated by setting the directions indicated by the arrows in FIG. 1 as reference directions. In addition, in FIG. 1, the forward side is set as the front side, and the backward side is set as the rear side.

As illustrated in FIG. 1, the printer 11 includes a rectangular-parallelepiped main body case 12. In the main body case 12, an extraction unit 14 which extracts an elongated sheet 13, a printing chamber 15 where printing is performed on the sheet 13 through ink ejection, a drying unit 16 which performs a drying process on the sheet 13 on which ink is attached through the printing, and a winding unit 17 which winds the sheet 13 on which the drying process is performed are disposed.

In other words, a plate-shaped base plate 18 which partitions the inner portion of the main body case 12 into upper and lower portions is disposed at a slightly upper position in the main body case 12, and the upper side area from the base plate 18 becomes a printing chamber 15 which is formed by supporting a rectangular plate-shaped supporting member 19 on the base plate 18. In addition, in the lower side area from the base plate 18, an extraction unit 14 is disposed at a left side position which is the upstream side in the transport direction of the sheet 13, and a drying unit 16 and a winding unit 17 are disposed at a right side position which is the downstream side.

As illustrated in FIG. 1, a winding shaft 20 which is extended in the forward/backward directions is rotatably provided to the extraction unit 14, and the sheet 13 is integrally rotatably supported with respect to the winding shaft 20 in the state where the sheet 13 is wound in a roll shape in advance. In other words, the sheet 13 is extracted from the extraction unit 14 by the rotation of the winding shaft 20. In addition, the sheet 13 extracted from the extraction unit 14 is wound around a first roller 21, which is located at the right side of the winding shaft 20, to be guided upwards.

On the other hand, in the left side of the supporting member 19, at a position corresponding to the first roller 21 of the lower side in the upward/downward directions, a second roller 22 is disposed to be parallel to the first roller 21 of the lower side. In addition, the sheet 13 of which the transport direction is changed into the vertically upward direction by the first roller 21 is wound around the second roller 22 from the left side downward direction, so that the transport direction thereof is changed into the horizontally rightward direction. Therefore, the sheet 13 is slidingly in contact with the upper surface of the supporting member 19.

In addition, in the right side of the supporting member 19, a third roller 23 which faces the second roller 22 of the left side with the supporting member 19 interposed therebetween is disposed to be parallel to the second roller 22. In addition, the position adjustment is performed so that the height of the apex of each of the circumference surfaces of the second roller 22 and the third roller 23 is equal to the height of the upper surface of the supporting member 19.

In the printing chamber 15, the sheet 13 of which the transport direction is changed into the horizontally rightward direction by the second roller 22 of the left side is transported to the right side, which becomes the downstream side, in the state where the sheet 13 is in contact with the upper surface of the supporting member 19. After that, the sheet 13 is wound around the third roller 23 from the right side upward direction, so that the transport direction thereof is changed into the vertically downward direction, so that the sheet 13 is transported toward the drying unit 16 of the lower side from the base plate 18. Next, the sheet 13 on which the drying process is performed by passing the sheet 13 through the drying unit 16 is further transported in the vertically downward direction. Then, the sheet 13 is wound around the fourth roller 24, so that the transport direction thereof is changed into the horizontally rightward direction. The winding shaft 25 of the winding unit 17 disposed in the right side of the fourth roller 24 is rotated based on the driving force of the transport motor (refer to FIG. 2), so that the sheet 13 is wound in a roll shape.

As illustrated in FIG. 1, a pair of guardrails 26 (indicated by a two-dot dashed line in FIG. 1) which are extended in the leftward/rightward directions are disposed in the front and rear sides of the supporting member 19 in the printing chamber 15. The upper surface of the guardrail 26 is configured to be higher than the upper surface of the supporting member 19. A rectangular carriage 27 is supported on the upper surfaces of the two guardrails 26 in the state where the reciprocating movement thereof in the main scan direction X (leftward/rightward directions in FIG. 1) illustrated in FIG. 1 may be performed along the two guardrails 26 based on the driving of the first carriage motor 62 (refer to FIG. 2). In addition, the carriage 27 may be moved in the sub scan direction (the forward/backward directions perpendicular to the paper surface in FIG. 1) based on the driving of the second carriage motor 63 (refer to FIG. 2). In addition, a plurality of the recording heads 29 which are an example of the writing unit are supported on the lower surface side of the carriage 27 through the supporting plate 28.

A predetermined range from the left end to the right end of the supporting member 19 is considered to be the printing area, and the sheet 13 is intermittently transported in units of the printing area. Therefore, ink from the recording heads 29 is ejected on the sheet 13 fixed on the supporting member 19 according to the reciprocating movement of the carriage 27, so that the printing is performed on the sheet 13.

In addition, at the printing time, the suctioning unit 30 installed in the lower side of the supporting member 19 is driven, so that the sheet 13 is suctioned on the upper surface of the supporting member 19 by a suctioning force due to a negative pressure applied to a number of suctioning holes opening in the upper surface of the supporting member 19.

Next, if one-time printing with respect to the sheet 13 is finished, the negative pressure of the suctioning unit 30 is released, so that the sheet 13 is transported.

In addition, within the printing chamber 15, a maintenance unit 32 for performing maintenance of the recording heads 29 in the non-printing period is disposed in the non-printing area at the right side of the third roller 23. The maintenance unit 32 includes a cap 33 and a lifting unit 34 with respect to each of the recording heads 29. Each of the caps 33 is moved between a capping position where the cap 33 is in contact with a nozzle formation surface of each of the recording heads 29 and a recessing position where the cap 33 is separated from the nozzle formation surface according to the driving of the lifting unit 34.

In addition, as illustrated in FIG. 1, a plurality (for example, 8) of the cartridges IC1 to IC8 which contain different color ink are detachably mounted inside the main body case 12. In addition, each of the ink cartridges IC1 to IC8 is connected through an ink supplying passage (not shown) or the like to the recording heads 29, and each of the recording heads 29 ejects ink supplied from each of the ink cartridges IC1 to IC8. Therefore, in the printer 11 of this example, color printing using eight color inks may be performed. In addition, in the main body case 12, an openable-type cover 38 is installed at a position corresponding to the arrangement positions of the ink cartridges IC1 to IC8. A replacement operation for the ink cartridges IC1 to IC8 is performed when the cover 38 is opened. The manipulation of opening the cover 38 at the time when the ink cartridge replacement or the like is performed is configured to be detected by the control unit C.

The eight ink cartridges IC1 to IC8 contain ink of, for example, black (K), cyan (C), magenta (M), yellow (Y), and the like. In addition, a configuration where a moisturizing-solution cartridge containing a moisturizing solution is mounted may also be employed. It goes without saying that types of ink (number of colors) may be appropriately set. For example, a configuration where monochromic printing is performed by only black ink, a configuration where two color ink is used, or a configuration where an arbitrary number of colors (three or more colors) other than eight colors are used may also be employed.

Each of the ink cartridges IC1 to IC8 is electrically connected through a cartridge holder (not shown) to the control unit C, so that the ink remaining amount information of the corresponding color is written in the non-volatile storage device 47 (refer to FIG. 2) mounted on each of the ink cartridges IC1 to IC8. In addition, in the embodiment of the invention, the control unit C is connected to a UPS 48, so that power supplying to various driving systems and display systems of the printer 11 is performed from the UPS 48 through the control unit C. In addition, instead of the UPS 48, a general power supply having no uninterruptible power supply function may be used.

Figure 2:
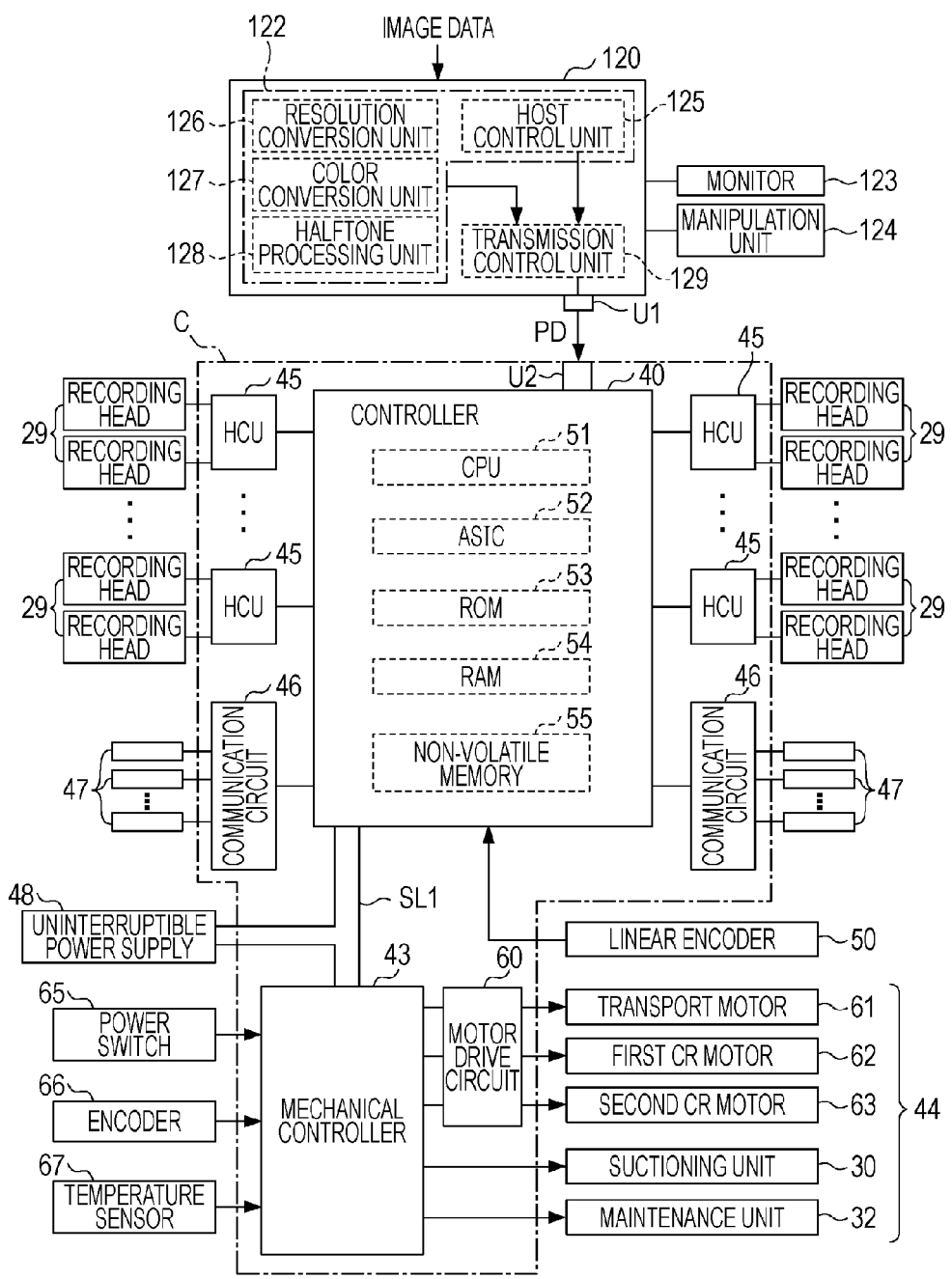
FIG. 2 is a block diagram illustrating an electrical configuration of the printing system.

FIG. 2 is a block diagram illustrating an electrical configuration of the printing system 100. The printer driver 122 in the host apparatus 120 illustrated in FIG. 2 includes a host control unit 125 which performs display control of various screens such as a menu screen and a printing condition setting screen which are to be displayed on the monitor 123 and performs a predetermined process according to a manipulation signal input from the manipulation unit 124 in the display state of each screen. The host control unit 125 performs overall control of the printer driver 122. In addition, the printer driver 122 includes a resolution conversion unit 126, a color conversion unit 127, and a halftone processing unit 128 to perform image processes necessary for generating printing data with respect to the image data received from the higher-level image generation apparatus 110. The resolution conversion unit 126 performs a resolution conversion process of converting a display resolution of the image data into a printing resolution. The color conversion unit 127 performs a color conversion process of converting colors in a display colorimetric system (for example, RGB colorimetric system or YCbCr colorimetric system) into colors in a printing colorimetric system (for example, CMYK colorimetric system). Furthermore, the halftone processing unit 128 performs a halftone process of changing pixel data in a high display grayscale (for example, 256 grayscale) into pixel data in a low printing grayscale (for example, 2 grayscale or 4 grayscale) or the like. Next, the printer driver 122 allocates a command described in a printing control code (for example, ESC/P) to the printing image data, which are generated as a result of the above image processes, to generate printing job data (hereinafter, simply referred to as "printing data PD").

The host apparatus 120 includes a transmission control unit 129 which performs data transmission control. The transmission control unit 129 performs serial transmission of the printing data PD generated by the printer driver 122 to the printer 11 sequentially in units of a predetermined amount of packet data.

On the other hand, the control unit C of the printer 11 includes a controller 40 which performs various controls of receiving the printing data PD from the host apparatus 120 and starting controlling the recording system. The controller 40 controls a plurality (15 in this example) of recording heads 29.

As illustrated in FIG. 2, the host apparatus 120 according to the embodiment of the invention includes a serial communication port U1. In addition, the controller 40 also includes a serial communication port U2. Next, the transmission control unit 129 performs serial transmission of the printing data PD corresponding to the controller 40 through communication between the serial communication ports U1 and U2.

As illustrated in FIG. 2, the controller 40 is connected to a plurality (N (8 in the example)) of the head control units 45 (hereinafter, simply referred to as "HCUs 45"), and each of the HCUs 45 is connected to a plurality (M (2 in the example)) of the recording heads 29.

In addition, the communication circuits 46 connected to the controller 40 are connected to the eight storage devices 47 of the eight ink cartridges IC1 to IC8. The controller 40 may communicate with the storage devices 47 mounted on the eight ink cartridges IC1 to IC8. The storage devices 47 are constructed with the non-volatile storage devices. Each of the storage devices 47 stores various types of ink-associated information such as ink remaining amount information, ink color, use-by date, maintenance information, or part number of the corresponding ink cartridge IC. In addition, in the state where the ink cartridges IC (refer to FIG. 1) are mounted on the cartridge holders, the storage devices 47 and the terminal portions of the cartridge holder side are electrically connected to each other, so that the communication circuits 46 may perform communication for reading and writing with respect to the storage devices 47.

The controller 40 manages the ink remaining amounts or the like of the eight ink cartridges IC1 to IC8. The controller 40 communicates with each of the storage devices 47 of the ink cartridges IC1 to IC8 through the communication circuits 46, so that the reading and writing of the ink-associated information may be performed.

In addition, the control unit C includes a mechanical controller 43 connected to the output side (control downstream side) of the controller 40 through the communication line SL1. The mechanical controller 43 controls a mechanical system 44 which mainly includes the transport system and the carriage driving system. The controller 40 is configured to transmit a carriage activation command to the mechanical controller 43 in the stage where the printing of a plurality (for example, 15) of the recording heads 29 allocated to the controller 40 may be prepared (in other words, in the stage where printing image data used for ink droplet ejection control are prepared). Therefore, it is possible to avoid an ejection problem where ink droplets are not ejected irrespective of whether the recording heads 29 reach the ejection position due to the activation of the carriage 27 before the completion of the printing preparation of one of the controllers 40.

In addition, in the stage where the printing of the plurality of the recording heads 29 allocated to the controller 40 is completed, the controller 40 transmits a transport command which instructs the transport of the sheet 13 to the mechanical controller 43. Therefore, it is possible to avoid a problem where the landing position of the ink droplets ejected from the recording heads 29 on the sheet 13 shifts (also referred to as printing position shift) due to the initiation of the transport process of the sheet 13 (the releasing of the suctioning of the sheet on the supporting member 19) before completion of the printing.

As illustrated in FIG. 2, a linear encoder 50 is connected to the controller 40. The linear encoder 50 is installed along the movement path of the carriage 27, so that the controller 40 is input with a detection signal (encoder pulse signal) having pulses of which the number is proportional to a movement distance of the carriage 27 from the linear encoder 50. The encoder pulse signal input to the controller 40 is used to acquire the main scan direction position (carriage position) the carriage 27 and the carriage movement direction or to generate an ejection timing signal output to the recording heads 29.

As illustrated in FIG. 2, the controller 40 includes a CPU 51 (central processing unit), an ASIC 52 (Application Specific Integrated Circuit), a ROM 53, a RAM 54 as an example of a second storage unit, and a non-volatile memory 55 as an example of a first storage unit. The CPU 51 executes a program stored in the ROM 53 to execute various tasks necessary for the printing control. In addition, the ASIC 52 performs data process or the like of the recording system such as printing data (PD) processing. In addition, the program including the tasks may be stored in the non-volatile memory 55.

In the embodiment of the invention, as the RAM 54, a DRAM (Dynamic Random Access Memory) is used. As the DRAM, an SDRAM (Synchronous DRAM), a DDR SDRAM (Double-Data-Rate SDRAM), a DDR2 SDRAM, DDR3 SDRAM, or the like is used. Besides, an EDO DRAM (Extended Data Out DRAM), a burst EDO DRAM, or the like may be used. In addition, as the RAM 54, a SRAM (Static Random Access Memory) may be used.

In addition, in the embodiment of the invention, as the non-volatile memory 55, for example, an FeRAM (ferroelectric memory) is used. In addition, an MRAM (Magneto resistive RAM), a PRAM (Phase change RAM), and an ReRAM (Resistive RAM) may be used. In addition, if the writable number is relatively large, an EEPROM or a flash memory may be used as the non-volatile memory 55.

On the other hand, the mechanical controller 43 is connected through a motor driving circuit 60 to the transport motor 61, a first carriage motor (hereinafter, referred to as a "first CR motor 62"), and a second carriage motor (hereinafter, referred to as a "second CR motor 63") which constitute the mechanical system 44. In addition, the mechanical controller 43 is connected to a suctioning unit 30 and the maintenance unit 32. In addition, in the embodiment of the invention, an example of the printing unit is constructed with the recording heads 29 and the mechanical system 44. Therefore, the first CR motor 62 and the second CR motor 63 also constitute an example of a component of the printing unit. In addition, an example of the transport unit in the printing unit is constructed with the transport motor 61, the rollers 21 to 24, the shafts 20 and 25, and the like in the printing unit of the mechanical system 44.

In addition, the mechanical controller 43 is connected to a power switch 65, an encoder 66, and a temperature sensor 67 as input systems. The ON signal of the time when the power switch 65 is manipulated to be turned on and the OFF signal of the time when the power switch 65 is manipulated to be turned off are transmitted through the mechanical controller 43 to the controller 40. The controller 40 and the mechanical controller 43 are connected to the UPS 48, so that the controller 40 instructs the UPS 48 to perform power supplying based on the input of the ON signal of the power switch 65 and instructs the UPS 48 to perform stopping of the power supplying based on the input of the OFF signal of the power switch 65.

In addition, the mechanical controller 43 controls the driving of each of the motors 61 to 63, the suctioning unit 30, and the maintenance unit 32 according to various commands received from the controller 40 through the communication line SL1. The encoder 66 detects the rotation of the rotation shaft of the transport driving system using the transport motor 61 as a power source, and the mechanical controller 43 detects the transport amount and the transport position of the sheet 13 by using the detection signal (encoder pulse signal) of the encoder 66.

In addition, the temperature sensor 67 is provided so as to detect the temperature of the sheet 13, and the temperature detection signal according to the sheet temperature is input from the temperature sensor 67 to the mechanical controller 43. The sheet temperature is used to calculate an adjustment value which is necessary for the operation of the printer 11.

At the printing time, the control unit C performs a transport operation of transporting the sheet 13 by driving the transport motor 61 to locate the next to-be-printed area of the sheet 13 on the supporting member 19, a suctioning operation for suctioning the next to-be-printed area on the supporting member 19 after the sheet transporting, a printing operation of printing on the sheet 13 by the recording heads 29, and a suctioning release operation of releasing the suctioning of the sheet 13 after the ending of the one-time (one-page) printing. At this time, the printing operation (recording operation) is performed by ejecting ink droplets from the recording heads 29 during the movement of the carriage 27 in the main scan direction X. The printing operation is performed by repeating the movement (1 path operation) of the carriage 27 in the main scan direction X by the driving of the first CR motor 62 and the movement of the carriage 27 in the sub scan direction by the driving of the second CR motor 63, which is performed at every end of one path at predetermined times.

FIG. 4 is a block diagram illustrating an electrical configuration of portions associated with a computer in the controller 40. As illustrated in FIG. 4, the CPU 51, the ASIC 52, the ROM 53, the RAM 54, and the non-volatile memory 55 are connected to each other via a bus 56, so that the CPU 51 and the ASIC 52 are configured to access the ROM 53, the RAM 54, and the non-volatile memory 55 through the bus 56. In addition, the bus 56 is connected to a memory controller 57, and the memory controller 57 is connected through the bus 58 to another RAM 59. The RAM 59 is mainly used as a buffer for storing various data, that is, before-process data, processin-progress data, and after-process data at the time of the image process for the printing data. The ASIC 52 accesses the RAM 59 through the memory controller 57 to perform reading of the printing data and process-in-progress printing image data and writing the data (plain data, head control data, or the like) obtained by performing the image process on the read data. In addition, a portion of the image process is performed by the CPU 51, and the CPU 51 also accesses the RAM 59 through the memory controller 57 to perform reading of the printing image data or the like and writing of the after-image-processing data. In addition, data transmission (DMA transmission) between the ASIC 52 and the RAM 59 is performed by the memory controller 57. Instruction of the data transmission process to the memory controller 57 and settings of the transmission conditions, and the like are performed through the access of the CPU 51 to the memory controller 57.

Various image processes are performed on the printing data by the CPU 51 and the ASIC 52, so that the plain data and the head control data are sequentially generated. In other words, a decomposition process for the printing data, a micro-weave process for allocating pixels of the printing image data to the nozzles, and the like are performed by the CPU 51, so that the plain data are generated; and the image process such as an aspect conversion process is performed on the plain data by the ASIC 52, so that the head control data are generated. In addition, in the embodiment of the invention, the plain data and the head control data correspond to recording data generated through the image process.

The head control data stored in the RAM 59 is transmitted through the HCUs 45 illustrated in FIG. 2 to each of the recording heads 29. Each of the recording heads 29 is embedded with a head driving circuit (not shown), so that the head driving circuit drives and controls an ejection driving device (not shown) installed to each of the nozzles based on the head control data, so that ink droplets are ejected from the nozzles of the recording heads 29. In addition, as the ejection driving device, a piezo electric device (piezo device) for transforming voltages into vibrations, an electrostatic driving device, and a heater device for ejecting ink droplets by using a bubble force at the time when ink is heated to be boiled may be used.

Figure 3:
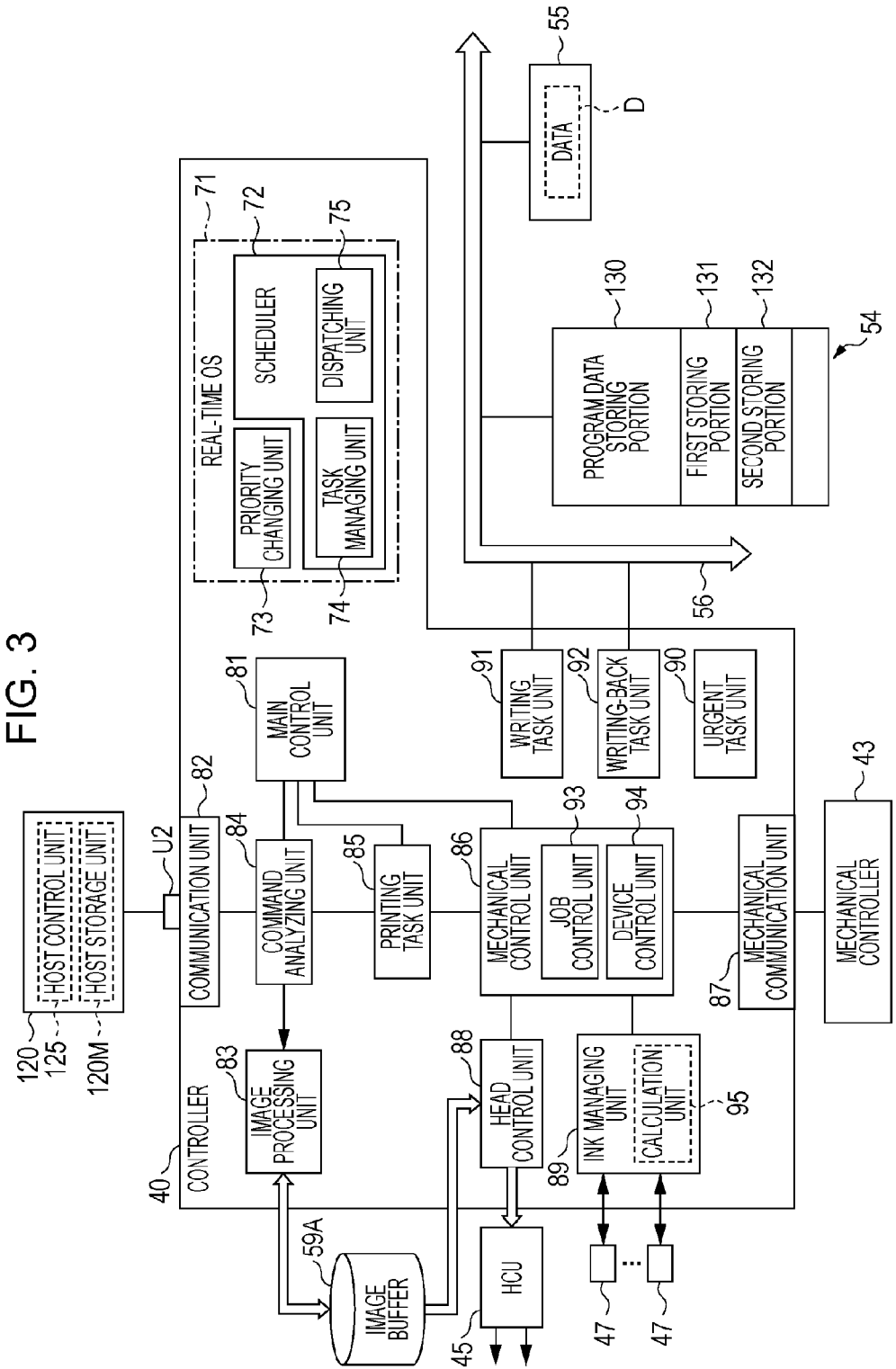
FIG. 3 is a block diagram illustrating a functional configuration of a controller.

FIG. 3 is a block diagram illustrating functional configurations of the controller 40. Various functional configuration components in the controller 40 illustrated in FIG. 3 are implemented by program execution of the CPU 51.

As illustrated in FIG. 3, the controller 40 includes a real-time OS 71 as an example of a control unit as an OS (Operating System). In addition, in the controller 40, a plurality of task units 81 to 92 or the like which are selectively activated under the control of the real-time OS 71 are disposed. As illustrated in FIG. 3, the plurality of task units include a main control unit 81, a communication unit 82, an image processing unit 83, a command analyzing unit 84, a printing task unit 85, a mechanical control unit 86, a mechanical communication unit 87, a head control unit 88, an ink management unit 89, an urgent task unit 90 (emergency task unit), a writing task unit 91 as an example of a writing unit and a copying unit, a writing-back task unit 92 as an example of a writing-back unit, and the like. The main control unit 81 collectively controls the task units 82 to 92. In addition, in the embodiment of the invention, an example of the data storage processing apparatus is configured to include the real-time OS 71, the task units 81 to 92, a RAM 54, and a non-volatile memory 55.

The real-time OS 71 includes a scheduler 72 and a priority changing unit 73 as an example of a priority changing unit. The scheduler 72 includes a task management unit 74 and a dispatch unit 75.

The scheduler 72 manages schedules of the task units 81 to 92. In other words, when a request for activating the task units 81 to 92 is received, if an empty portion exists, the task unit is activated; and if a different task unit is already in progress (Run status), the task unit is set to a Ready status. Next, when a notice SC (service call) indicating that the process is ended or that the standby status occurs is received from the in-progress task unit, if the task unit in the Ready status exists, the task unit having the highest priority among the task units is activated, so that the running task (activation task) is switched. The task management unit 74 manages the task status (Wait, Ready, Run, and the like). If the scheduler 72 receives the notice SC (service call) which becomes a task changing event, the dispatch unit 75 notifies an activation instruction to the task unit having the highest priority among the ready-state task units with reference to the task status managed by the task management unit 74 to activate the task unit.

The task management unit 74 includes a priority management table 97 illustrated in FIGS. 5A and 5B. In the priority management table 97, the tasks are arrayed in the order of the priorities thereof. In the example of FIGS. 5A and 5B, a plurality of tasks are arrayed in descending order of priority from the upper portion, so that as the task is positioned at the upper portion, the higher priority is set.

The priority changing unit 73 has a function of changing the priorities of the tasks, which are to be activated by the scheduler 72, by reordering the priorities in the priority management table 97. At the power-on time, the real-time OS 71 sets the normal-time priority management table 97 illustrated in FIG. 5A. At the power-off time (normal power-off time) of the printer 11 due to the manipulation of turning off the power switch 65 or at the power shutdown (abnormal power-off time) due to the unplugging of a power plug, the disruption of a power supply, or the like, the priority changing unit 73 changes the priority management table 97 from the order of the normal-time priorities illustrated in FIG. 5A into the order of the power-off time priorities illustrated in FIG. 5B. Herein, the CPU 51 of each task executes one task, so that one task unit among the task units 81 to 92 illustrated in FIG. 3 is activated. The task units 81 to 92 illustrated in FIG. 3 correspond to a main control task, a communication task, a command analyzing task, an image process task, a printing task, a mechanical control task, a mechanical communication task, a head control task, an ink management task, an urgent task, a writing task, and a writing-back task as performing objects of the CPU 51. In addition, in the case of the configuration using a normal power supply having no uninterruptible power supply function, electricity failure also becomes a cause of the abnormal power off.

In the normal-time priority management table 97 illustrated in FIG. 5A, the priorities are set in the order of the urgent task, the writing task, the head control task, the image process task, . . . , and the writing-back task. In other words, the priority of the writing task unit 91 is set to be higher than those of the printing system task units 81 to 89, and the priority of the writing-back task unit 92 is set to be lower than those of the printing system task units 81 to 89. Herein, the printing system task units 81 to 89 denote task units which have functions of performing processes necessary for performing a printing process based on the printing data PD. In the embodiment of the invention, the printing system task unit includes the communication unit 82 and the mechanical communication unit 87 included in the communication system task unit, the main control unit 81, the image processing unit 83, and the head control unit 88 included in the recording system task unit, and the command analyzing unit 84, the printing task unit 85, and the mechanical control unit 86 included in the mechanical driving system task unit (command process system task unit). In addition, the communication system task units 82 and 87 are classified into the communication unit 82 which are included in both of the recording system and the mechanical driving system and the mechanical communication unit 87 which is included in only the mechanical driving system. In addition, in the embodiment of the invention, an example of the printing control unit is configured with the printing system task units 81 to 89.

In the embodiment of the invention, in this manner, at the normal time, the writing task unit 91 is set to the highest priority among the tasks except for the urgent task unit 90, and the writing-back task unit 92 is set to the lowest priority. Accordingly, the writing task unit 91 is set to a priority higher than those of the printing system task units 81 to 89, and the writing-back task unit 92 is set to a priority lower than those of the printing system task units 81 to 89.

In addition, in the power-off time priority management table 97 illustrated in FIG. 5B, the priorities are set in the order of the urgent task, the writing task, the writing-back task, the head control task, the image process task, . . . . In other words, in the state where the priority relationship between the writing task unit 91 and the writing-back task unit 92 is maintained to be the same as that of the normal time, the writing task unit 91 and the writing-back task unit 92 are set to have first and second priority among the tasks except for the urgent task unit 90. In this manner, at the power-off time, in the state where the priority of the writing task unit 91 is maintained to be higher than that of the writing-back task unit 92, both of the writing task unit 91 and the writing-back task unit 92 are set to the priorities higher than those of the printing system task units 81 to 89. In other words, at the power-off time, in the state where the priority relationship between the writing-back task unit 92 and the writing task unit 91 is maintained, the writing-back task unit 92 is changed from the priority lower than those of the printing system task units 81 to 89 into the priority higher than those of the printing system task units 81 to 89.

Returning to FIG. 3, functions of the task units 82 to 92 are described.

The communication unit 82 includes communication driver software for controlling the serial communication port U2 to control serial communication performed through the serial communication port U2 with respect to the host apparatus 120. The printing data PD received by the communication unit 82 are stored in the image buffer 59A. The image buffer 59A is constructed with at least a portion of the storage area of the RAM 59. More specifically, the image buffer 59A includes a receiving buffer, an intermediate buffer (plain buffer), and a printing buffer (image buffer), and the printing data PD are first stored in the receiving buffer.

The image processing unit 83 reads the printing data PD from the image buffer 59A to first decompose the printing data PD. Herein, the printing data PD include printing image data and a printing language description command, and the image processing unit 83 temporarily stores the decomposed printing image data in the image buffer 59A (more specifically, the plain buffer) and transmits the printing language description command to the command analyzing unit 84.

The command analyzing unit 84 analyzes the printing language description command in the decomposed printing data PD to acquire a control command and transmits the acquired command to the printing task unit 85.

As the process after the decomposition of the printing data PD, the image processing unit 83 sequentially performs the image process such as a micro-weave process (nozzle allocation process) on the printing image data (plain data) read from the image buffer 59A to generate the head control data which are used for controlling the recording heads 29 and to store the head control data in the image buffer 59A (specifically, image buffer). In addition, the micro-weave process denotes a specific allocation process of allocating each of the dots of the printing image data (plain data) to each of the nozzles so that main scan lines (dot lines) which are recorded by the nozzles, which are adjacent to each other in the sub scan direction, are not adjacent to each other in the nozzle formation surfaces of the recording heads 29. In addition, in the embodiment of the invention, some image processes such as an aspect conversion process are performed by image processing circuits (not shown) such as an aspect conversion circuit in the ASIC 52. At the aspect conversion processing time, the ASIC 52 performs data transmission through the memory controller 57 (refer to FIG. 4) with respect to the RAM 59. The process of transmission starting instruction or transmission condition setting with respect to the memory controller 57 is performed by the CPU 51. Therefore, in the embodiment of the invention, a portion of the main control unit 81 is configured by a software portion through which the CPU 51 performs the data transmission process, the transmission condition setting process, and the like. In this point, the main control unit 81 belongs to the recording system task units 81 to 83 and 88 which perform the recording system process including the image process for generating the ejection system data used for the recording operation of the recording heads 29. In the embodiment of the invention, an example of the recording system process unit is configured with the recording system task units 81 to 83 and 88.

The head control unit 88 reads the head control data from the image buffer 59A and divides the head control data into the recording heads 29 to allocate the HCUs 45 and transmit the head control data. In addition, the HCUs 45 sequentially transmits the received head control data to the corresponding recording heads 29. A head driving circuit (not shown) in each of the recording heads 29 drives and controls the ejection driving device for each of the nozzles based on the head control data to eject ink droplets from the nozzles. At this time, the head driving circuit inputs an ejection timing signal, which is generated based on an encoder pulse signal of the linear encoder 50, and drives the ejection driving device at every ejection timing based on the ejection timing signal to form dots by using the ink droplets with a predetermined printing resolution on the sheet 13 in the main scan direction X.

The printing task unit 85 illustrated in FIG. 3 performs a command process for processing the command received from the command analyzing unit 84 into a command having a format through which the mechanical controller 43 may be instructed and transmitting the processed command to the mechanical control unit 86.

The mechanical control unit 86 includes a job control unit 93 which controls jobs by managing the received commands in the performing order and a device control unit 94 which controls various devices such as a head driving system, a transport system, and a carriage driving system by controlling the output sites and output timings of the commands received in the performing order from the job control unit 93. Since the job control unit 93 receives a completion notice command of the sequence operation of the head driving system, the transport system, the carriage driving system through the device control unit 94 in the process performing the printing operation instructed as a printing job, the job control unit 93 may check the driving timing of the head driving system, the transport system, and the carriage driving system. Therefore, the job control unit 93 may recognize timings of ends of the printing operations. Herein, the end of printing operation indicates a timing of a new page when one page printing is finished, a timing where the carriage 27 is moved once in the main scan direction X and one row printing (1 path) is finished, or the like.

The device control unit 94 is connected to the mechanical communication unit 87, the head control unit 88, the ink management unit 89, the urgent task unit 90, and the like and has a device manager function of outputting a command to each of the configuration components or receiving a notice from each of the configuration components to control these devices. The device control unit 94 monitors the progress of the process of, for example, the head control unit 88 and transmits the command for mechanical sequence to the mechanical communication unit 87 in the stage where the head control data used for the next-path printing may be prepared. In addition, the device control unit 94 monitors the status of the transport system and the carriage driving system in the mechanical system 44 based on apparatus status information (status information) notified by the mechanical controller 43 and issues the ejection starting instruction to the head control unit 88 at an appropriate state timing at the ejection starting time.

As a sequence control command, there are, for example, a transport command, a suctioning command, a first carriage activation command (carriage main scan direction movement command), a second carriage activation command (carriage sub scan direction movement command), a suctioning release command, and the like. The device control unit 94 issues these commands at an appropriate timing according to the progress of the head control unit 88 or at an appropriate timing according to the progress of the mechanical controller 43.

If the mechanical communication unit 87 receives the command from the mechanical control unit 86, the mechanical communication unit 87 transmits the command to the mechanical controller 43. In addition, if the mechanical communication unit 87 receives a command reception success response (ACK signal), a retry request (NACK signal) which is a command reception failure response, a command issued by the mechanical controller 43, or status information from the mechanical controller 43, the mechanical communication unit 87 transmits them to a higher-level mechanical control unit 86.

The ink management unit 89 illustrated in FIG. 3 manages the ink-associated information of each of the ink cartridges IC1 to IC8. The ink management unit 89 includes a calculation unit 95. The calculation unit 95 calculates ink consumption amounts consumed by the recording heads 29 and the maintenance unit 32 and ink remaining amounts of the ink cartridges IC1 to IC8. More specifically, the calculation unit 95 calculates the ink consumption amounts of eight colors consumed by the recording heads 29. Herein, the head control unit 88 is embedded with a dot counter (not shown) which counts dot number of each color corresponding to an ink droplet ejection number of each of the recording heads 29 based on the head control data. The calculation unit 95 acquires the dot numbers of each color of the recording heads 29 from the head control unit 88 and sums up the acquired dot numbers of each color to calculate the ink consumption amount of each ink color consumed by all of the recording heads 29 based on the summed dot number of each color. In addition, the ink management unit 89 acquires the ink consumption amount according to a kind (strength, time, or the like) of cleaning which the maintenance unit 32 performs on the recording heads 29.

In addition, in a predetermined time such as a time when one-time printing is finished, a time when an ink cartridge is replaced, a time when cleaning is finished, or a power shutdown time when the power switch 65 is manipulated to be turned off, the ink management unit 89 calculates the ink consumption amounts of the eight colors consumed by all of the recording heads 29 color by color (ink cartridge by ink cartridge). Furthermore, the calculation unit 95 calculates the current ink remaining amount of the eight colors by subtracting the ink consumption amounts of the eight colors from the previous-time ink remaining amounts of the eight colors. In the embodiment of the invention, the ink management unit 89 acquires the ink remaining amount information and the ink-associated information (a portion of data) including information associated with ink or the like.

Furthermore, the ink management unit 89 also monitors a status of the ink cartridge IC to perform detection of errors associated with ink. The ink management unit 89 determines, for example, whether or not the ink remaining amount calculated by the calculation unit 95 is less than an ink end threshold value. If the ink remaining amount is less than the threshold value, the ink management unit 89 determines that the status of the ink cartridge IC is the ink end. For example, after the status of the ink cartridge IC becomes the ink end, if a predetermined allowable printing time elapses or if a period elapses until a predetermined allowable ink amount is consumed, an error message for forcibly stopping the printing operation is notified by the mechanical control unit 86 to the urgent task unit 90. In addition, when a failure of the ink cartridge IC or a mounting of a different color ink cartridge IC is detected, an error message is notified by the mechanical control unit 86 to the urgent task unit 90. The error notice is attached with an identifier (for example, an error command number) or a parameter value through which the error content may be recognized. In this manner, the ink management unit 89 also acquires ink-associated error detection information as a portion of the ink-associated information.

If the urgent task unit 90 receives the error notice from the ink management unit 89, the urgent task unit 90 determines the content of the error based on the identifier or the parameter value and issues an error command of a kind according to the determined error content. The error command is transmitted through the mechanical control unit 86 to an appropriate transmission site. For example, the error command for the ink end notice is transmitted to the mechanical controller 43 and the host control unit 125 to indicate the emergency stop of the operation of the mechanical system 44 or display indication of the ink end on the monitor 123 of the host apparatus 120. In addition, the urgent task unit 90 has a power-off function and a power shutdown detection function. If the OFF signal of the time when the power switch 65 is manipulated to be turned off is input to the urgent task unit 90, the urgent task unit 90 outputs the aforementioned priority changing request to the real-time OS 71 through the power-off function. After that, if the urgent task unit 90 receives a writing-back completion notice indicating that a data backup process is finished, the urgent task unit 90 performs a processing of shutting down the printer 11 to turn off the power supply after the shutting down process. In addition, when the urgent task unit 90 detects accidental power shutdown such as unplugging of a power plug or disruption of a power supply through the power shutdown detection function, similar, the urgent task unit 90 outputs the priority changing request to the real-time OS 71. In addition, the power-off time writing-back completion notice is a notice indicating that data backup processes of the writing task unit 91 and the writing-back task unit 92 are finished.

When the printer 11 is activated at the time when the power switch 65 is manipulated to be turned on, the writing task unit 91 reads the data D (including the printing-associated information) from the non-volatile memory 55 connected through the bus 56 to the CPU 51 and perform the writing process for writing the read data D in the RAM 54. In addition to the printing-associated information, the data D includes the adjustment value data (correction value data) acquired as a result of an adjustment process or the like when the main control unit 81 instructs the printing task unit 85 to perform the adjustment process for allowing the printing task unit 85 to drive the recording heads 29 and the mechanical system 44. As the adjustment process, there is an ejection timing adjustment process for adjusting the ejection timing of the recording heads 29 at the forward movement time and backward movement time of the carriage 27 according to the difference in individual products of the printer 11 or the thickness of the sheet 13 (medium thickness) or the like. As the ejection timing adjustment process, there is, for example, a method of printing a test pattern and inputting a number or a numerical value determined to be an optimal value by a user in the test pattern, a method of perform an image analysis on image data acquired by reading a test pattern by using a scanner and obtaining an optimal adjustment value from a result of the image analysis by the printer 11, or the like. In this case, the main control unit 81 updates the ejection timing adjustment value (correction value) among the data D in the first storage unit 131. This type of the adjustment value (correction value) is updated only when the user selects the performing of the adjustment process. Therefore, generally, once the value is set at a previous time, the value is not almost updated. In other words, the value is information close to a fixed value. Accordingly, once this type of the adjustment value is read and set at the power-on time of the printer 11, neither reading nor rewriting thereof is substantially performed. In the embodiment of the invention, the printing-associated information includes the ink-associated information such as an ink remaining amount, an ink consumption amount, and a time remaining to ink cartridge use-by date, the number of printing pages, the billing information, the maintenance information (performing times of each maintenance item), the printing performing time information, and the like.

In addition, the writing-back task unit 92 reads the data D stored in the RAM 54 and perform the writing-back process of writing the read data D back to the non-volatile memory 55.

As illustrated in FIG. 3, the RAM 54 includes a program data storage unit 130, a first storage unit 131 (mirror storage area unit), and a second storage unit 132 (copying storage area unit). The program data storage unit 130 is a storage area which becomes a writing site of program data or various setting values read from the ROM 53 (or the non-volatile memory 55).

The first storage unit 131 (mirror storage area unit) is a storage area which becomes a writing site of the data D read from the non-volatile memory 55. The first storage unit 131 is a storage area which the printing system task units 81 to 89 and the urgent task unit 90 access to perform the reading and writing of data. At the power-on time, the data D written from the non-volatile memory 55 to the first storage unit 131 are sequentially updated by the writing access from each of the task units 81 to 90 during the operation of the printer 11 (during the power-on time). For example, the ink management unit 89 accesses the first storage unit 131 to write the printing-associated information such as an ink remaining amount or a time remaining to ink cartridge use-by date in the first storage unit 131, so that a portion of the information such as the ink remaining amount information among the data D is updated. It goes without saying that the data D in the first storage unit 131 may be updated through the writing access of the other printing system task unit. In addition, the details of the data updating in each of the task units are described later.

The second storage unit 132 (copying storage area unit) is a storage area which becomes a copying site of the data D read from the first storage unit 131. Although the writing access of the writing task unit 91 to the second storage unit 132 and the reading access of the writing-back task unit 92 to the second storage unit 132 are permitted, the writing access of each of the task units 81 to 90 to the second storage unit 132 is prohibited. However, the reading access of each of the task units 81 to 90 to the second storage unit 132 may be permitted.

Since the writing-back task unit 92 has the lowest priority among the task units 81 to 92 (refer to FIG. 5A), the writing-back task unit 92 is activated during the standby of the printer 11 where the printing operation, the maintenance operation, or the like is not performed. Next, the writing-back task unit 92 activated in the standby status of the printer 11 performs a process (writing-back process) of writing the data D stored in the second storage unit 132 back to the non-volatile memory 55. If the writing-back task unit 92 completes the writing-back process, the writing-back task unit 92 is configured to perform the writing-back completion notice to the writing task unit 91.

If the writing task unit 91 receives the writing-back completion notice from the writing-back task unit 92, the writing task unit 91 issues the activation request to the real-time OS 71. Since the writing task unit 91 has the highest priority among the task units 81 to 89, 91, and 92 excluding the urgent task unit 90, the writing task unit 91 is activated immediately after the completion of the writing-back process of the writing-back task unit 92. When the writing task unit 91 receives the writing-back completion notice to be activated, the writing task unit 91 performs copying by overwriting the data D (updating data) in the first storage unit 131 on the second storage unit 132. It goes without saying that, when the data D in the first storage unit 131 is not updated between the previous-time copying and the current copying, the data D in the second storage unit 132 may not be changed through the copying.

In addition, at the power off manipulation time or at the power-off time (power shutdown time) due to the unplugging of a power plug, the disruption of a power supply, or the like, the urgent task unit 90 is activated, so that the urgent task unit 90 requests the priority changing unit 73 to perform the priority changing process. The priority changing unit 73 performs the priority changing process for changing the priorities in the priority management table 97 into the priorities illustrated in FIG. 5B, in other words, changing the priority of the writing-back task unit 92 into a priority (in this example, a third priority) which is higher than the priorities of the printing system task units 81 to 89. Therefore, at the power shutdown time, the writing-back task unit 92 is immediately activated, so that the latest data D of the second storage unit 132 at this time are written back to the non-volatile memory 55. In addition, at the power shutdown time during the copying process, the writing task unit 91 having a higher priority is started up, so that the in-progress copying process is ended, and after that, the writing-back task unit 92 is activated.

Herein, in this example where the non-volatile memory 55 is an FeRAM, the data storage capacity of the non-volatile memory 55 is relatively small in comparison with, for example, a flash memory. In the embodiment of the invention, up to now, the data stored in the non-volatile memory (for example, a flash memory) are mainly classified into data (invariable data) which are not or almost not updated during the operation of the printer and data (variable data) which are updated according to the performing of the printing or the time elapse, and the portion corresponding to the invariable data is configured to be stored in the host storage unit 120M of the host apparatus 120. Therefore, the capacity of the data D which are to be stored in the non-volatile memory 55 is relatively reduced, so that it is possible to use an FeRAM as the non-volatile memory 55. With respect to the flash memory, the writable number thereof is much smaller than that of the FeRAM, and the writing-back process is limited to the power-off time and the like. However, on the embodiment of the invention, since the FeRAM is used as the non-volatile memory 55, it is possible to perform the writing-back of the data D to the non-volatile memory 55 even during the operation of the printer 11 besides the power-off time. In addition, at the power-off time, the writing-back task unit 92 is configured to write the latest data D read from the second storage unit 132 of the RAM 54 back to the storage devices 47.

Figure 6:
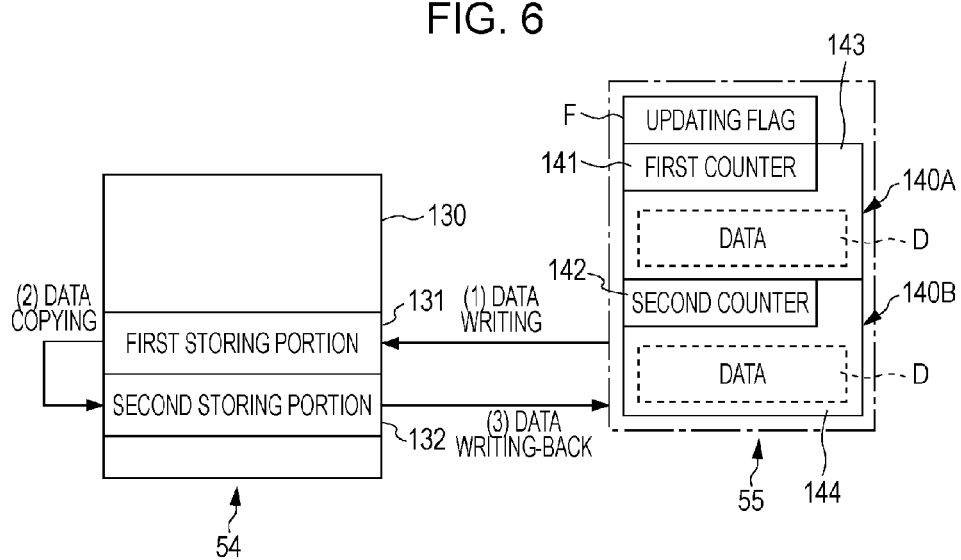
FIG. 6 is a block diagram illustrating a configuration of a non-volatile memory and a data storage process.

FIG. 6 is a block diagram illustrating a configuration of the non-volatile memory 55 and the writing process, the copying process, and the writing-back process. As illustrated in FIG. 6, the non-volatile memory 55 according to the embodiment of the invention includes an updating flag F, a first area 140A, and a second area 140B. A first counter 141 as an example of the counting unit is disposed in the first area 140A, and a second counter 142 as an example of the counting unit is disposed in the second area 140B. In addition, a first storage area 143 for storing the data D is disposed in the first area 140A, and a second storage area 144 for storing the data D is disposed in the second area 140B. The counters 141 and 142 are disposed in the areas of the front sides of the areas 140A and 140B, and the storage areas 143 and 144 are disposed in the areas of the rear sides from the counters 141 and 142.

In the embodiment of the invention, the writing-back of the data D in the second storage unit 132 by the writing-back task unit 92 is configured to be alternately switched between the first storage area 143 and the second storage area 144. The updating flag F is provided so as to select the storage area as the writing-back site among the two storage areas 143 and 144. If the updating flag F is "0", the first storage area 143 is selected as the writing-back site; and if the updating flag F is "1", the second storage area 144 is selected as the writing-back site. The updating flag F is configured so that the flag value thereof is switched when the writing-back process for the data D is finished. In addition, in the embodiment of the invention, an example of a plurality of storage units disposed in the non-volatile memory is constructed with the first storage area 143 and the second storage area 144. In other words, the embodiment of the invention is an example where the plurality of storage units comprises two storage units.

At the power-on time, the program data or the like of the ROM 53 are written in the program data storage unit 130 of the RAM 54, and the CPU 51 executes a boot program, so that the real-time OS 71 is booted. At the first time when the real-time OS 71 is booted, the writing task unit 91 is activated. As illustrated in FIG. 6, at the power-on time, the writing process of the data D from the storage area 143 or 144 of the non-volatile memory 55 to the first storage unit 131 of the RAM 54 is performed by the writing task unit 91 ((1) in FIG. 6) (writing stage). In other words, at the power-on time, the writing task unit 91 reads the data D, which are stored in the non-volatile memory 55 at the previous-time power-off time (power shutdown time), from the non-volatile memory 55 and writes the read data D in the first storage unit 131 of the RAM 54.

Only in the case of the writing process at the power-on time, the writing task unit 91 also the copying process subsequently to the writing process, so that the data D in the first storage unit 131 is copied in the second storage unit 132 ((2) in FIG. 6) (copying stage).

After that, if the printer 11 is in the standby status, the writing-back task unit 92 having the lowest priority among the task units 81 to 92 is activated. Next, the writing-back task unit 92 writes the data D in the second storage unit 132 back to the non-volatile memory 55 ((3) in FIG. 6) (writing-back stage). At this time, the writing-back task unit 92 selects one storage area which is to be the writing-back site among the first storage area 143 and the second storage area 144 based on the flag value of the updating flag F and writes the data D in the second storage unit 132 back to the selected storage area. Before the starting of the writing-back process, the count value CT of the one counter corresponding to the storage area of the writing-back site among the two counters 141 and 142 is changed into the writing-back starting value A. During the writing-back of the data D, when the writing-back task unit 92 performs the writing-back of the data of K bytes, the writing-back task unit 92 performs the counting process of the counter corresponding to the storage area of the writing-back site. In the embodiment of the invention, the writing-back task unit 92 increments the counter when the writing-back task unit 92 performs the writing-back of the data of K bytes.

If the writing-back task unit 92 performs the writing-back of all the data D to complete one-time writing-back process, the writing-back task unit 92 transmits the writing-back completion notice to the writing task unit 91. At the time of the transmission of the writing-back completion notice, the count value CT of the counter corresponding to the storage area of the writing-back site becomes the writing-back completion value B (for example, a maximum value). If the writing task unit 91 receives the writing-back completion notice, the writing task unit 91 is activated to perform the copying process for copying the data D from the first storage unit 131 to the second storage unit 132 ((2) in FIG. 6). Since the writing task unit 91 is a task unit of which the priority is higher than that of the printing system task unit, if the writing task unit 91 receives the writing-back completion notice, in general cases except for the urgent time such as an error occurrence time and a power shutdown time, the writing task unit 91 is immediately activated. In this manner, at the time of the writing-back, when the writing task unit 91 receives the writing-back completion notice transmitted from the writing-back task unit 92, the writing task unit 91 is activated to copy the data D in the first storage unit 131, which are updated in the time interval between the previous-time copying time and the current copying time, into the second storage unit 132 ((2) in FIG. 6). Next, when the printer 11 is in the standby status, the writing-back task unit 92 is activated to write the copied the data D in the second storage unit 132 back to the non-volatile memory 55 ((3) in FIG. 6).

Figure 7:
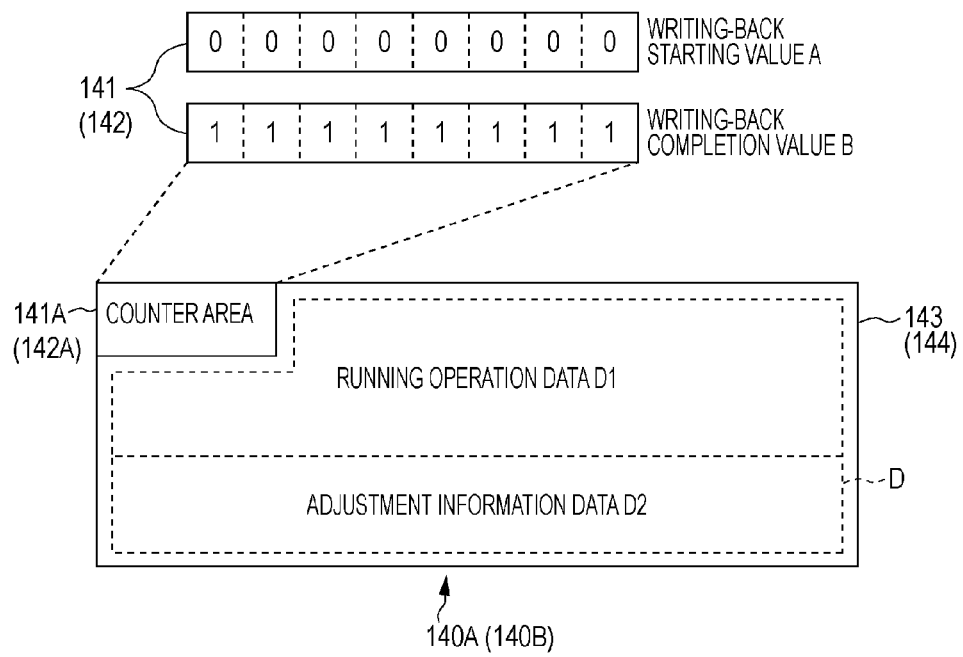
FIG. 7 is a schematic diagram illustrating configurations of two areas of the non-volatile memory.

FIG. 7 illustrates configurations of the first area 140A and the second area 140B in the non-volatile memory 55. However, since the configuration of the first area 140A is the same as that of the second area 140B, the configuration of the first area 140A is illustrated in FIG. 7. As illustrated in FIG. 7, the first area 140A (or the second area 140B) includes a counter area 141A (142A) which is used as the counter 141 (142) and a first storage area 143 (or a second storage area 144) which is a data storage area for storing the data D (backup data). Although the counter area 141A (142A) is configured as a writing prohibited area of the printing system task units 81 to 89 and the urgent task unit 90, the writing access of the writing task unit 91 and the writing-back task unit 92 is configured to be permitted. Therefore, the process (resetting, setting, counting processes or the like) for changing the count value of the counter 141 (142) by the writing task unit 91 and the writing-back task unit 92 may be performed.

As an example, 1 byte is secured for the counter area 141A (142A), so that an 8-bit counter 141 (142) is configured. In the embodiment of the invention, K bytes (K=(data capacity of data D)/255), which are the value formed by dividing the data size of the data D (that is, the storage area capacity of the data D) by 255, are set as a unit of the counting process for counting only the "1" in the counter 141 (142). In this example, the writing-back starting value A is set to the minimum value "00000000" (binary number), and if the writing-back of all the data D, which is started after the completion of the copying process of the writing task unit 91 is completed, the count value of the counter 141 (142) is configured to be the maximum value "11111111" (binary number). In this manner, in the embodiment of the invention, if the bit number of the counter 141 (142) is set to G, the value (bytes) obtained by subtracting the capacity DB (bytes) of the to-be-written-back data D by "$2^G-1$" is set as a unit of the counting process of the counter 141 (142). In addition, the capacity DB is set so as to be a multiple of K.

Figure 8:
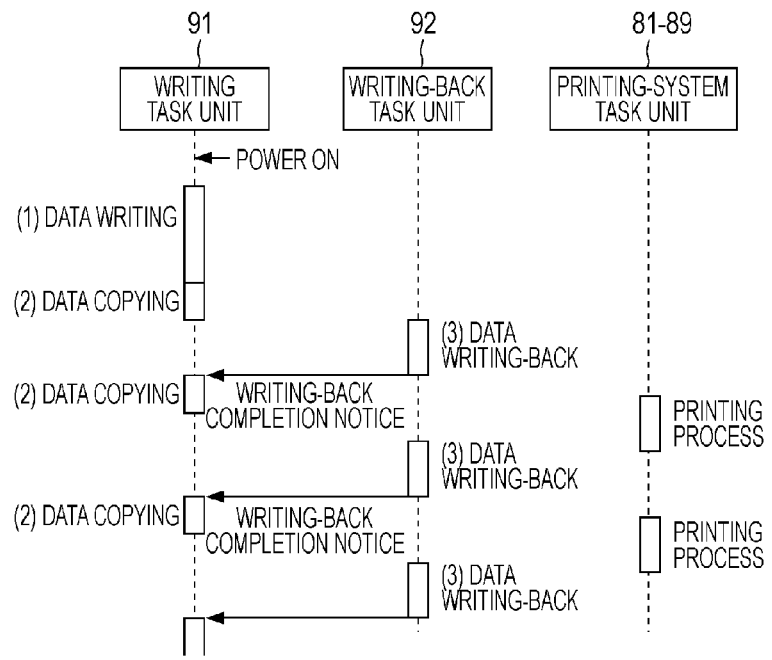
FIG. 8 is a sequence diagram illustrating a data storage process performed during normal operation of the printing system.
Figure 9:
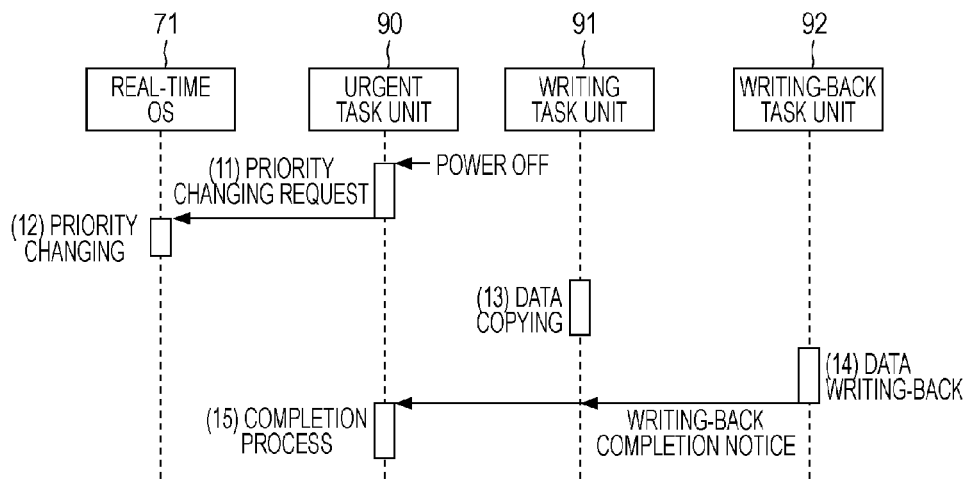
FIG. 9 is a sequence diagram illustrating a data storage process at a power-off time.

Hereinafter, in the printer 11, a data storage process performed through writing, copying, and the writing-back of the data D between the non-volatile memory 55 and the RAM 54 is described with reference to FIGS. 5 to 11 or the like. FIGS. 8 and 9 are sequence diagrams illustrating flows of processes of the writing task unit 91, the writing-back task unit 92, and the printing system task units 81 to 89. Herein, FIG. 8 is a sequence diagram illustrating a flow of a normal-time data storage process, and FIG. 9 is a sequence diagram illustrating a flow of a power shutdown-time data storage process. First, the normal-time data storage process from the power-on time before the power-off time is described with reference to FIG. 5A and FIGS. 6 to 8 and 10 or the like.

As illustrated in FIG. 8, at the power-on time, the program data or the like in the ROM 53 are written in the program data storage unit 130 of the RAM 54, and the CPU 51 executes the boot program or the like among the program data or the like, so that the real-time OS 71 is booted. At this time, the real-time OS 71 sets the priority management table 97 illustrated in FIG. 5A. At the normal time, the priority management table 97 to which the task management unit 74 refers is set so that the priority of the writing task is higher than that of the printing system task and the priority of the writing-back task is lower than that of the printing system task. After the booting of the real-time OS 71, the writing task unit 91 is first activated, so that the writing task unit 91 performs the writing process of writing the data D of the one storage area, which is updated beside thereof among the two storage areas 143 and 144 of the non-volatile memory 55, in the first storage unit 131 of the RAM 54 ((1) in FIGS. 6 and 8) (writing stage).

The writing task unit 91 also performs the copying process following the writing process only at the power-on time ((2) in FIG. 6 and First (2) of FIG. 8) (copying stage). In other words, the writing task unit 91 copies the data D in the first storage unit 131 into the second storage unit 132. At the power-on time, the printer 11 performs an initialization process of the mechanical system 44. Before or after the initializing process, if the printer 11 is in the standby status, the writing-back task unit 92 having the lowest priority among the task units 81 to 92 is activated. Next, the writing-back task unit 92 writes the data D of the second storage unit 132 back to the non-volatile memory 55 ((3) in FIGS. 6 and 8)) (writing-back stage). If all the data D are written back, the writing-back task unit 92 transmits a writing-back completion notice to the writing task unit 91. If the writing task unit 91 receives the writing-back completion notice, the writing task unit 91 is activated to perform the copying process of copying the data D in the first storage unit 131 into the second storage unit 132 ((2) in FIG. 6 and Second (2) and the following (2)'s (2) in FIG. 8).

During the period when the printer 11 is in the standby status, the copying ((2) in FIG. 8) of the data D in the first storage unit 131 into the second storage unit 132 by the writing task unit 91 and the writing-back ((3) in FIG. 8) of the data D in the second storage unit 132 to the non-volatile memory 55 by the writing-back task unit 92 are repetitively performed.

For example, after the printer 11 is powered on, if the user performs printing performing instruction and manipulation with respect to the image generation apparatus 110, the printing data PD are transmitted from the host apparatus 120 to the printer 11. The printing data PD transmitted to the printer 11 are received by the communication unit 82 which is activated by the real-time OS 71 in the controller 40. Hereinafter, the real-time OS 71 allows the printing system task units 81 to 89 to perform the printing system process including the recording system process and the command process (transport system and carriage driving system process) as a multitasking process by selectively switching one task unit which are to be activated according to the data flow of the writing processing system and the command flow of the command processing system among the printing system task units 81 to 89.

In the recording system process, a decomposition process of the printing data PD received by the communication unit 82 by the image processing unit 83, an image process for generating the head control data from the printing image data (plain data), a transmission process for transmitting the head control data through the HCUs 45 to the recording heads 29 by the head control unit 88, and the like are performed. In the command process of the transport system and the CR driving system, analysis (command analysis) of the printing language description command by the command analyzing unit 84, a command process by the printing task unit 85, command queue management and command output timing control according to a mechanical sequence by the mechanical control unit 86, and transmission of a command to the mechanical controller 43 by the mechanical communication unit 87 are performed. In this manner, the mechanical sequence control of the mechanical system 44 and ink ejection control of the recording heads 29 according to the command of the transport system and the carriage driving system are performed at an appropriate timing, so that the printer 11 performs the printing operation of printing an image based on the printing data PD on the sheet 13.

In the printing operation, the first CR motor 62 is driven based on the carriage activation command, so that the carriage 27 is moved in the main scan direction X. During the movement, the head driving circuit in the recording heads 29 drives the ejection driving device based on the head control data to eject ink droplets from nozzles, so that 1-path printing is performed. Next, when the carriage 27 finishes the 1-path movement, the second CR motor 63 is driven, so that the carriage 27 is moved in the sub scan direction. These operations are repeated for multiple paths, so that 1-page printing is performed. If the 1-page printing is finished, the mechanical controller 43 releases the suctioning of the suctioning unit 30 based on a suctioning release command from the controller 40 and drives the transport motor 61 based on the transport command to transport the sheet 13 by a predetermined transport pitch. In addition, in a predetermined period during the printing, the carriage 27 is allowed to be moved to the flushing position to eject ink droplets, which are not related to the printing, from the nozzles of the recording heads 29 to the cap 33 (waste liquid container), so that flushing (null ejection) for preventing or solving the clogging of the nozzles is performed. In addition, when a predetermined time elapses from the previous-time cleaning performing time or when the elapsing time exceeds a predetermined time at the power-on time, the maintenance unit 32 is driven to perform cleaning process for forcibly venting ink from the nozzles of the recording heads 29. The cleaning is performed by driving a suction pump (not shown) to introduce a negative pressure into the cap 33 under the capping state where the cap 33 is in contact with the nozzle formation surfaces of the recording heads 29 through the driving of the lifting unit 34. In addition, with respect to the flushing operation or the cleaning operation, a portion thereof is performed by activating a portion of the printing system task units 81 to 89.

When the ink management unit 89 performs a predetermined operation involved with ink consumption such as a printing operation, a flushing operation, or a cleaning operation, for example, the ink management unit 89 allows the calculation unit 95 to calculate the ink consumption amount and the ink remaining amount at a predetermined time such as during the operation (for example, interval between operations) or just after the operation. For example, the ink remaining amount may be obtained by subtracting the currently calculated ink consumption amount from the previous-time ink remaining amount. The ink management unit 89 rewrites the data of the previous-time ink consumption amount, ink remaining amount, and the like among the data D in the first storage unit 131 of the RAM 54 with the data of the current ink consumption amount, ink remaining amount, and the like.

In addition, at a predetermined time such as the power-on time, the ink cartridge replacement time, the ink management unit 89 accesses the storage devices 47 to detect a mounting status (presence or absence of mounting failure, mounting mistake (wrong color), or the like), a use-by date, an ink end (ink disconnection), and the like of the ink cartridge IC. For example, if the storage devices 47 may not be accessed, the ink management unit 89 detects it as a mounting failure. In addition, various types of information on the ink such as ink colors, a use-by date, and an ink remaining amount is stored in the storage devices 47. If the ink colors read from the storage devices 47 do not correspond to the ink colors of the ink cartridge which is mounted at the accessed mounting position at this time, the ink management unit 89 detects it as a mounting mistake (wrong color). In addition, the ink management unit 89 calculates a time remaining to ink cartridge use-by date based on use-by date information read from the storage devices 47 and time information of a real-time clock (not shown). If the time remaining to ink cartridge use-by date is less than "0", the ink management unit 89 detects it as a use-by date error.

Furthermore, if the ink remaining amount read from the storage devices 47 is equal to or more than a predetermined value of the ink end information, the ink management unit 89 detects it as an ink disconnection (ink end). In addition, the ink remaining amount of the storage devices 47 is set to the ink remaining amount of full charge (full) in the initial period, and the ink remaining amount is updated by writing the ink remaining amount or the like of the first storage unit 131 of at least power-off time.

The ink management unit 89 access a predetermined storage area of the first storage unit 131 of the RAM 54 and updates the ink-associated information (the ink consumption amount, the ink remaining amount, the ink disconnection information, the use-by date remaining time, the mounting failure, the mounting mistake, the use-by date error information, and the like).

In addition, the job control unit 93 acquires job information on a printing job commanded from the host apparatus 120. The job control unit 93 calculates the printing length or the printing sheet number of each job based on the operation information of the transport system acquired from the mechanical controller 43. Furthermore, the job control unit 93 calculates the billing information based on the printing length or the printing sheet number. Next, the job control unit 93 access a predetermined storage area of the first storage unit 131 to update the job information including the billing information.

In addition, the mechanical controller 43 is provided with a counter (not shown) which counts the number of output pluses of the encoder 66 of the transport system to acquire the count value corresponding to the transport amount of the sheet 13, so that the mechanical controller 43 acquires the information on the printing length, which is the length of the printed sheet 13, or the printing sheet number based on the change amount of the count value of the counter during the printing. In addition, the mechanical controller 43 acquires various types of mechanical parameter information on the transport system, the carriage driving system, the cleaning system, and the like. The mechanical parameter information includes, for example, status information such as a transport status (position, speed, or the like), a carriage driving status (position, speed, or the like), or a cleaning status and operation history information such as driving time intervals or driving rotation numbers of various motors of the transport system, the carriage driving system, and the cleaning system. The type of the mechanical parameter information is periodically transmitted from the mechanical controller 43 to the controller 40. The mechanical parameter information is received by the device control unit 94 in the controller 40. In addition, the device control unit 94 acquires the operation time of the printer 11 based on time information of a real-time clock. Next, the device control unit 94 access the first storage unit 131 of the RAM 54 to rewrite mechanical parameter information obtained by adding the operation time to the information acquired from the mechanical controller 43.

The head control unit 88 includes a dot counter which counts an ink droplet ejection number (dot number) of the recording heads 29 for each ink color to acquire head information including the ink droplet ejection number (dot number) for each ink color from the count value. Next, the head control unit 88 access the first storage unit 131 of the RAM 54 to update the acquired head information.

In addition, the printer 11 has an adjustment function for acquiring various adjustment values (correction values). For example, in an adjustment function, a measurement unit thereof is operated to measure an actual measurement value, and an adjustment value (correction value) for adjusting (correcting) of an initial setting value is acquired based on a difference between the initial setting value and the actual measurement value. Such a type of the adjustment value includes a flushing starting position and a flushing ending position in the main scan direction X, a cap position, a reference position of determining an ejection starting position at the printing time, a transport reference position, an adjustment value (correction value) for correcting a transport amount by considering extension of the sheet 13 according to a sheet temperature, and the like. Herein, the sheet temperature is detected by a temperature sensor 67, and the sheet temperature is transmitted from the mechanical controller 43 to the controller 40. The printing task unit 85 calculates a transport adjustment value according to the detected sheet temperature.

In addition, as another adjustment function, there is a function of printing a test pattern and acquiring an ejection timing adjustment value corresponding to a number based on the number corresponding to one test pattern which the user inputs under the determination that the test pattern is the optimal printing result among the test pattern. Such a type of the adjustment value includes a Uni-d adjustment value for adjusting the ejection timing of the recording heads 29 in the main scan direction X at the one-directional printing time and a Bi-d adjustment value for adjusting the ejection timing of the carriage 27 at the forward movement time and the backward movement time in the bi-directional printing. The ejection timing according to the sheet thickness (for example, a paper thickness) may be calculated by using the Uni-d adjustment value or the Bi-d adjustment value. Such a type of the adjustment information is updated when the adjustment function of the printer 11 is operated through user manipulation or when the number of the like corresponding to the optimal indicator such as the optimal test pattern is input through the user manipulation. The updated adjustment information is updated through the access of the printing task unit 85 to the first storage unit 131 of the RAM 54. Such adjustment information data are set at the shipping inspection stage of the printer 11, the first booting time of the printer 11 when the user first uses the printer 11, the time of an adjustment task performed through user operation of an adjustment mechanism, the maintenance time for repairing disorder, or the like. The adjustment information data are data which are not updated for the time being once the data are set.

In this manner, as the data D, there are the operation information data D1 including the ink-associated information which are relatively frequently updated during the operation of the printer 11, the job information, the mechanical parameter information, the head information, and the like and the adjustment information data D2 (fixed information data) including the adjustment information which is not almost updated (has low updating frequency) during the operation of the printer 11. In the embodiment of the invention, in the data D, the operation information data D1 are disposed in the front side, and the adjustment information data D2 are subsequently disposed in the following side. Therefore, in the writing-back process, the operation information data D1 are first written back, and subsequently, the adjustment information data D2 are written back. However, as the adjustment information, there is a type of which the adjustment information is relatively frequently updated with the optimal adjustment information through periodical operation of the adjustment function by the controller 40. Such a type of adjustment information is disposed in the area of the operation information data D1.

If an error in the printing operation occurs, the urgent task unit 90 writes the error information including the information, through which the details of the error may be analyzed, in the first storage unit 131 of the RAM 54. In the embodiment of the invention, the host apparatus 120 is connected through the Internet to a user-supporting server (not shown), so that the error information is transmitted from the host apparatus 120 to the server. The server performs a process for investigating the cause of the error by analyzing the error information or a process for searching for a method of recovering the printer 11 from the error. In addition, in the example, the error information is disposed in the area included in the adjustment information data D2.

At the printing process time when the printing system task units 81 to 89 are activated in this manner, the data D in the first storage unit 131 are updated at an appropriate timing (data updating stage). The updated data D of the first storage unit 131 are copied into the second storage unit 132 by the activated writing task unit 91. In addition, in the embodiment of the invention, the ink-associated information, the job information, the mechanical parameter information, the head information, the adjustment information, and the error information correspond to the printing-associated information updated through the operation of the printer 11. In addition, in the data D, information which is written in the non-volatile memory 55 (first storage unit) also exists although the information is not updated through the operation of the printer 11.

In the embodiment of the invention, the host control unit 125 of the host apparatus 120 periodically or non-periodically requests the controller 40 to transmit the data D. At an empty time when the printing operation, the cleaning operation, or the like is not performed or at an ending process time of the power-off time, the controller 40 transmits the data D in the first storage unit 131 or the second storage unit 132 of the RAM 54 to the host control unit 125 as a form of response to the request. The host control unit 125 stores the received data D in the host storage unit 120M. Accordingly, the host storage unit 120M of the host apparatus 120 also periodically or non-periodically stores the data D of which frequency is less than the writing-back frequency. In addition, all or some of the data D are transmitted from the host apparatus 120 via the Internet to a server of a printer maker so as to be used for analysis of the operating status of the printer 11 or the like.

When the printing process is the printing operation is performed, the writing-back task unit 92 having the lowest priority is not activated. Therefore, since the writing task unit 91 does not receive the writing-back completion notice, during the printing process or the printing operation, the copying process for the data D by the writing task unit 91 is not basically performed.

If the printer is in the standby status where neither the printing operation nor the cleaning operation is performed, the writing-back task unit 92 is activated. Therefore, the writing-back task unit 92 writes the data D in the second storage unit 132 back to the non-volatile memory 55 ((3) in FIG. 8). Since the data D at this time are the data which are finally copied by the writing-back task unit 92, the data D are old data before the printing operation. However, if the writing-back completion notice is received from the writing task unit 91, the writing task unit 91 copies the latest data D of the first storage unit 131 into the second storage unit 132 ((2) in FIG. 8). After the copying process, the re-activated writing-back task unit 92 writes the latest data D of the second storage unit 132 back to the non-volatile memory 55. When the printer 11 is in the standby status in this manner, the updated data D are written back.

Herein, since the priority of the writing task unit 91 is higher than those of the printing system task units 81 to 89, a problem in that original copying data are rewritten through the interrupt of the printing system task units 81 to 89 during the copying process does not occur. In addition, since the writing access to the second storage unit 132 by the printing system task units 81 to 89 and the urgent task unit 90 is not permitted, a problem in that original writing-back data are rewritten by the printing system task units 81 to 89 during the writing-back of the writing-back task unit 92 is avoided. In addition, since the activation condition of the writing task unit 91 indicates the time when the writing-back completion notice of the time when the writing-back task unit 92 finishes the writing-back of the data D is received, a problem in that the original writing-back data are rewritten through the interrupt of the copying process during the writing-back of the writing-back task unit 92 may be avoided. As a result, correct data D may be written back from the RAM 54 to the non-volatile memory 55 by the writing-back task unit 92. In addition, the stage where the printing system task unit performs processes for printing to acquire the printing-associated information corresponds to the printing control stage.

Next, the writing-back process is described in detail. In the embodiment of the invention, the writing-back task unit 92 alternately switch the writing-back site of the data D in the second storage unit 132 between the first storage area 143 and the second storage area 144 of the non-volatile memory 55. In other words, when the updating flag F is "0", the writing-back task unit 92 performs the writing-back of the data D to the first storage area 143, and if the writing-back is completed, the writing-back task unit 92 switches the updating flag F from "0" to "1". In addition, when the updating flag F is "1", the writing-back task unit 92 performs the writing-back of the data D to the second storage area 144, and if the writing-back is completed, the writing-back task unit 92 switches the updating flag F from "1" to "0". In this manner, the data in the second storage unit 132 are alternately written back between the first storage area 143 and the second storage area 144.

In addition, in the progress of the writing-back process for the data D, a counting process of the counter corresponding to the storage area of the writing-back site among the two counters 141 and 142 is performed. As a result of the counting process, the count value CT of the counter has a value corresponding to the written-back data amount.

Figure 10:
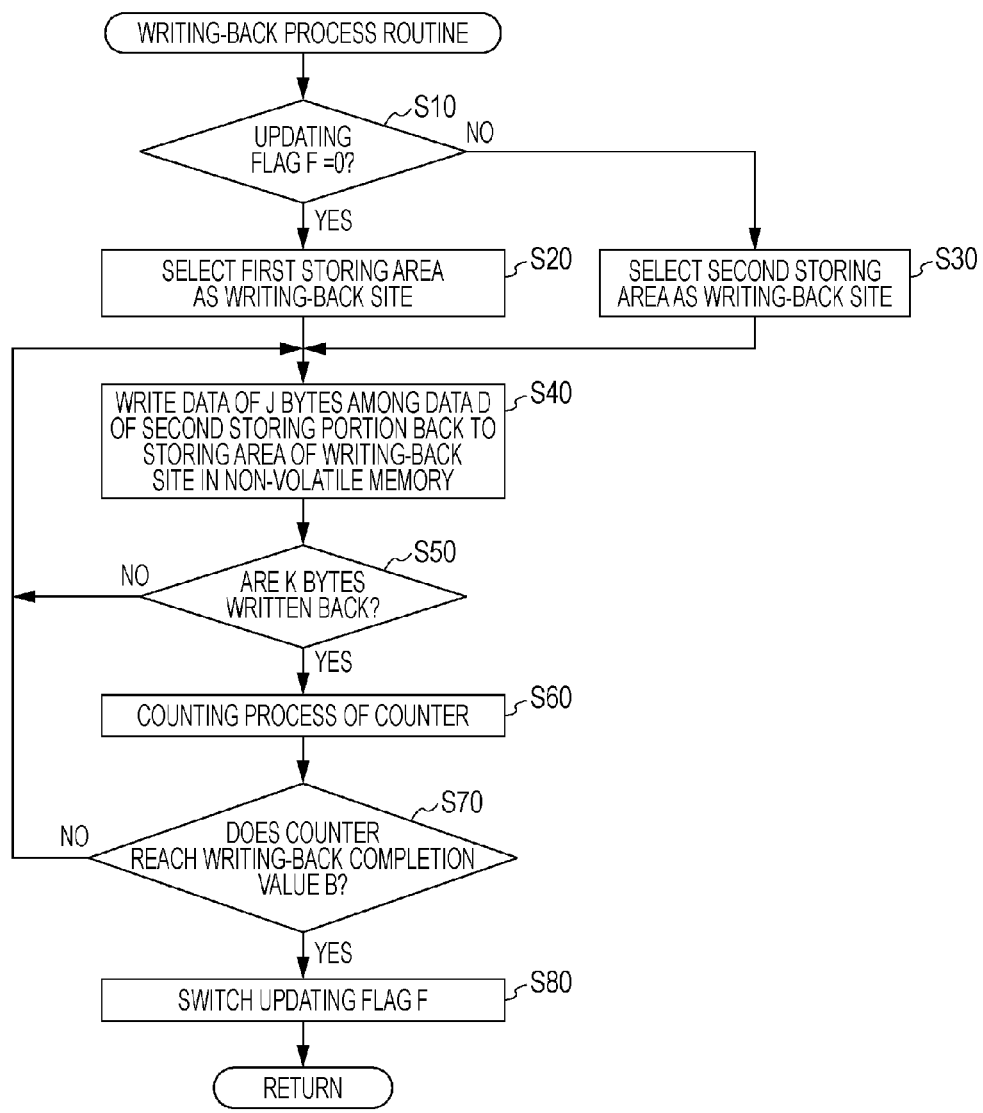
FIG. 10 is a flowchart illustrating a writing-back process.
Figure 11:
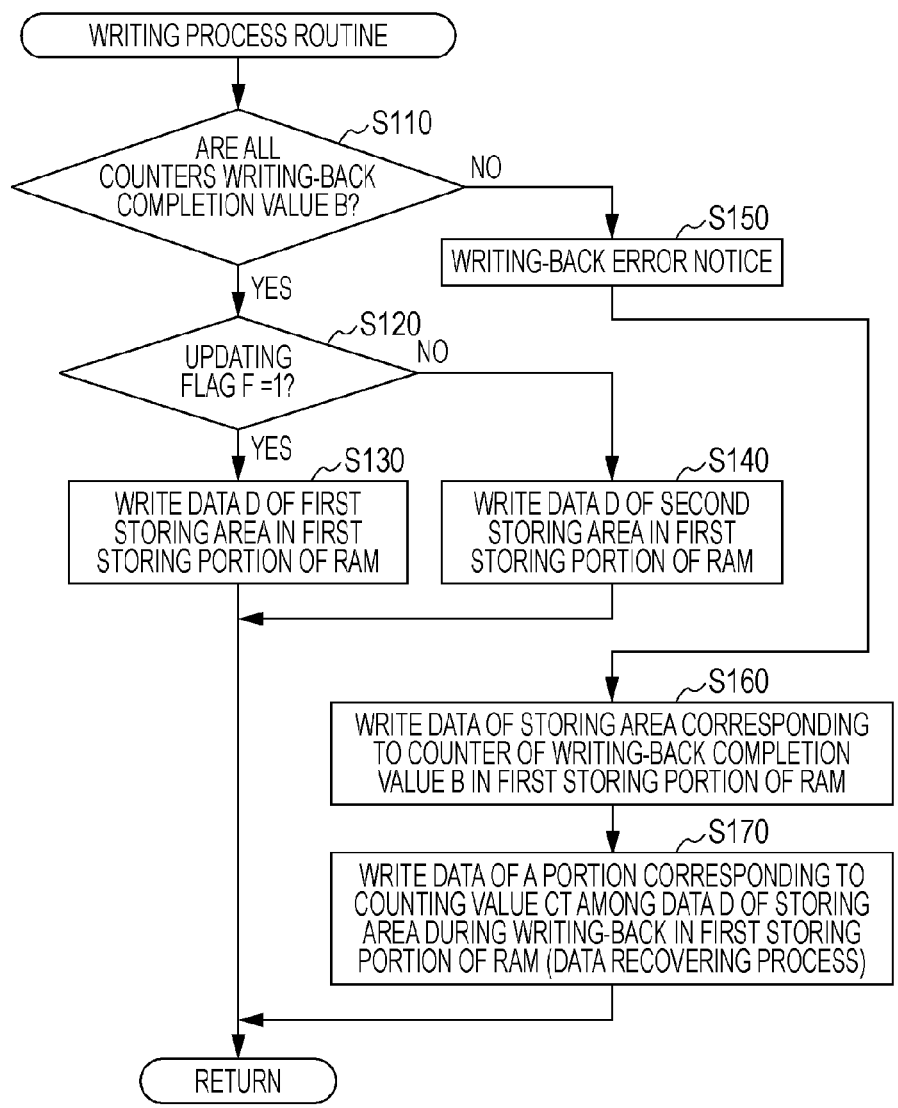
FIG. 11 is a flowchart illustrating a writing process.

Hereinafter, the writing-back process which the writing-back task unit 92 is activated to perform is described with reference to the flowchart illustrated FIG. 10. FIG. 10 is a writing-back process routine in which the details of the writing-back task are illustrated by a flowchart. After the copying process, when the printer 11 is in a standby status, the writing-back task unit 92 is activated. First, at Step S10 in FIG. 10, it is determined whether or not the updating flag F=0. If the updating flag F=0, the process proceeds to Step S20; if not the updating flag F=0 (in other words, F=1), the process proceeds to Step S30.

At Step S20, the first storage area 143 is selected as a writing-back site. At this time, before the starting of the writing-back process, the count value CT of the first counter 141 corresponding to the first storage area 143 of the writing-back site is changed into the writing-back starting value A.

On the other hand, at Step S30, the second storage area 144 is selected as a writing-back site. At this time, before the starting of the writing-back process, the count value CT of the second counter 142 corresponding to the second storage area 144 of the writing-back site is changed into the writing-back starting value A.

At Step S40, the data of J bytes among the data D in the second storage unit 132 are written back to the storage area which is selected as the writing-back site of the non-volatile memory 55. In other words, when the updating flag F=0 and the first storage area 143 is selected as the writing-back site (S20), the data D are written back to the first storage area 143. On the other hand, when the updating flag F=1 and the second storage area 144 is selected as the writing-back site (S30), the data D are written back to the second storage area 144. In addition, the data D newly copied in the second storage unit 132 are written back, the writing-back is sequentially performed from the first portion of the data D by J bytes. In addition, when the same data D are written back as a continuation of the stopped previous writing-back, the writing-back is sequentially performed from the position corresponding to the count value CT at that time by J bytes. Herein, the J bytes are the minimum unit of the writing-back, and in the example, the J bytes are the value (J=K/n) of 1/n (n is a natural number) times the K bytes which is the unit of the performing of the counting process of the counters 141 and 142. In addition, the changing (for example, resetting) of the counter into the writing-back starting value A performed before the start of the writing-back process may be performed by the writing task unit 91 at the copying process completion time.

In the next Step S50, it is determined whether or not K bytes are written back. If the K bytes are not written back, the data of the next J bytes are written back to the non-volatile memory 55 (S40). Next, if the n-times writing-back of J bytes is repeated so that K (=J×n) bytes are written back (affirmative determination at Step S50), the process proceeds to Step S60.

At Step S60, the counting process of the counter is performed. In other words, the counting process of the counter corresponding to the storage area of the writing-back site among the counters 141 and 142 is performed. In this example, as the counting process, the count value CT of the counter is incremented by "1".

Next, at Step S70, it is determined whether or not the count values CT of the counters 141 and 142 reach the writing-back completion value B. Similar to the following description, if the count values CT do not reach the writing-back completion value B, the process returns to Step S40 to repeat Steps S40 to S70 until the count values CT reach the writing-back completion value B (affirmative determination at Step S70). As a result, when the writing-back of K bytes is completed, the counter is incremented through the counting process. Therefore, if the writing-back of all the data D to the non-volatile memory 55 is ended, the count value CT of the counter reaches the writing-back completion value B (affirmative determination at Step S70), and the process proceeds to Step S80.

At Step S80, the switching of the updating flag F is performed. Next, after the writing-back completion notice is transmitted to the writing task unit 91, the routine is ended. In other words, the writing-back task unit 92 is inactivated. In addition, when the writing-back process performed as a process at the power shutdown time (power-off time) is finished, the writing-back completion notice is transmitted to the urgent task unit 90. In addition, if there is an interrupt of the task unit having a priority higher than that of the writing-back task unit 92 during the writing-back process, although the count value CT of the counter does not reach the writing-back completion value B, the writing-back task unit 92 proceeds to the ready state at this time, so that the writing-back process is stopped.

In this manner, during the running of the printer 11, the data D in the first storage unit 131 of the RAM 54 are updated by the printing system task units 81 to 89 or the urgent task unit 90. Therefore, the updated data D is copied from the first storage unit 131 to the second storage unit 132, and after that, the data D is written back to the non-volatile memory 55 at a predetermined period such as a standby status period. The writing-back to the non-volatile memory 55 is alternately switched between the first storage area 143 and the second storage area 144. In other words, when the updating flag F is "0", the writing-back task unit 92 performs the writing-back of the data D to the first storage area 143; and if the writing-back is completed, the writing-back task unit 92 switches the updating flag F from "0" to "1". In addition, when the updating flag F is "1", the writing-back task unit 92 performs the writing-back of the data D to the second storage area 144; and if the writing-back is completed, the writing-back task unit 92 switches the updating flag F from "1" to "0". Furthermore, if the writing-back of the data D to the first storage area 143 is completed, the count value CT of the first counter 141 corresponding to the first storage area 143 becomes the writing-back completion value B. Next, if the writing-back of the data D to the second storage area 144 is started, during the writing-back, the count value CT of the second counter 142 corresponding to the second storage area 144 of the writing-back site becomes the value according to the written-back data amount. Next, if the writing-back to the second storage area 144 is completed, the count value CT of the second counter 142 corresponding to the second storage area 144 becomes the writing-back completion value B. Next, if the writing-back of the data D to the first storage area 143 is started, during the writing-back, the count value CT of the first counter 141 corresponding to the first storage area 143 of the writing-back site becomes the value according to the written-back data amount. Next, if the writing-back to the first storage area 143 is completed, the count value CT of the first counter 141 corresponding to the first storage area 143 becomes the writing-back completion value B.

Therefore, when the writing-back of all the data D with respect to both of the first storage area 143 and the second storage area 144 is completed, all the count values CT of the corresponding counters 141 and 142 become the writing-back completion value B. In addition, when the writing-back of the data D with respect to only the one of the first storage area 143 and the second storage area 144 is completed and the writing-back with respect to the other one is in progress, the count value CT of the counter corresponding to the one of the counters 141 and 142 becomes the writing-back completion value B, the count value CT of the counter corresponding to the other becomes a value other than the writing-back completion value B, for example, a central value.

Next, a data storage process at the power shutdown (power-off) time is described with reference to FIGS. 5A and 5B, FIG. 9, and the like. In addition, as the power shutdown (power off), there are normal power shutdown (normal power off) when the user turns off the power switch 65 and abnormal power shutdown (abnormal power off) such as accidental power shutdown of unplugging of a power plug, the disruption of a power supply, or the like, and power shutdown of a system down time. In the power shutdown time data storage process, the normal power off and the abnormal power off are different from each other according to the existence of the ending process ((15) in FIG. 9) illustrated in FIG. 9. In the example of FIG. 9, although the data storage process at the normal power-off time is illustrated, a process where the ending process in FIG. 9 is cancelled becomes the data storage process at the abnormal power-off time. In addition, in the embodiment of the invention, the printer 11 includes a secondary battery, so that, although accidental power shutdown (abnormal power off) such as unplugging of a power plug or disruption of a power supply occurs, the power is supplied from the secondary battery in a predetermined time interval within a range of, for example, 10-500 milliseconds until the secondary battery is discharged.

The normal power off (normal power shutdown) of the time when the user manipulates the power switch 65 is detected through the input of the OFF signal to the controller 40. On the other hand, the abnormal power off (abnormal power shutdown) caused by the unplugging of a power plug, the disruption of a power supply, or the like is detected through the power shutdown detection function of the urgent task unit 90 in the controller 40.

As illustrated in FIG. 9, if the normal or abnormal power off (power shutdown) is detected, the urgent task unit 90 is activated. In other words, the real-time OS 71 activates the urgent task unit 90 having the highest priority among the task units which receive the activation request. For example, although there is a case where the power is shutdown during the printing operation, the urgent task unit 90 of which the priority is higher than those of the printing system task units 81 to 89 is activated. First, the activated urgent task unit 90 transmits the priority changing request to the real-time OS 71 ((11) in FIG. 9). The priority changing request is received by the priority changing unit 73 in the real-time OS 71, and the priority changing unit 73 performs the task priority changing process for changing the priority management table 97, which is referred to by the task management unit 74, from the normal-time task priority illustrated in FIG. 5A into the power-off time task priority illustrated in FIG. 5B ((12) in FIG. 9). The priority changing unit 73 performs, for example, a process of changing the order of the tasks of the priority management table 97. It goes without saying that the task priority changing process may also be a process of switching the to-be-referred table among a plurality of the prepared priority management tables 97 into the table illustrated in FIG. 5B.

As a result of the task priority changing process, in the state where the priority relationship between the writing task unit 91 and the writing-back task unit 92 is maintained, the priorities of the task units 91 and 92 become higher than those of the printing system task units 81 to 89. In other words, the priorities are changed so that the priority of the writing-back task unit 92 is lower than that of the writing task unit 91 and higher than those of the printing system task units 81 to 89.

Therefore, at the power shutdown (power off) time, even if the printing operation is proceeding at that time, the writing-back task unit 92 is activated. In addition, at the power shutdown time during the standby of the printer 11, the writing task unit 91 or the writing-back task unit 92 is activated. For example, at the power shutdown time during the printing operation, the data D written back just before the starting of the printing operation are stored in the non-volatile memory 55. In addition, at the power shutdown time during the standby without the printing operation, the latest data D is repetitively written back during the standby up to that time, the latest data D is stored in the non-volatile memory 55.

Similar to the example of FIG. 9, at the power off (power shutdown), if the writing task unit 91 is in the copying process, after the copying process of the writing task unit 91 having a higher priority is ended, the writing-back task unit 92 having the next higher priority is activated. Next, the writing-back task unit 92 performs the writing-back process of the copied data D ((13) and (14) in FIG. 9 and Steps S10 to S80 in FIG. 10). At the power shutdown time, the writing-back task unit 92 is allowed to intercept during the copying of the writing task unit 91 according to the activation priorities, so that it is possible to avoid a problem in that the data D for which the copying is in progress are written back. Therefore, in the power shutdown time, the correct latest data D for which the copying is completed by the writing task unit 91 may be written back to the non-volatile memory 55.

In addition, when the writing-back is in progress at the power shutdown time, when the CPU execution right is switched from the urgent task unit 90, the writing-back task unit 92 is re-activated. At this time, the writing-back task unit 92 perform the writing-back process for the data D from the position corresponding to the count value CT (Steps S10 to S80 in FIG. 10).

When the writing-back process is normally ended at the power shutdown time, the count value CT of the counter corresponding to the storage area of the writing-back site becomes the writing-back completion value B (CT=B). On the other hand, when the writing-back process is not normally ended, the count value CT of the counter corresponding to the storage area of the writing-back site becomes a value other than the writing-back completion value B (CT≠B).

At the normal power-off time, the urgent task unit 90 which receives the writing-back completion notice from the writing-back task unit 92 is activated, so that the ending process of the printer 11 is performed. The ending process is a process for setting the printer 11 to the state of the printer of the finishing time at the power-off time and corresponds to the preparation process before the power shutdown. In the ending process, a predetermined process such as a data backup process is performed. It goes without saying that, for example, if the carriage 27 is not at a home position, the ending process may also include an ending operation for returning various operation portions to initial positions such as an operation of moving the carriage 27 to the home position and capping the recording heads 29. If the ending process is completed, the urgent task unit 90 immediately shuts down the power. In addition, at the normal power-off time, since there is a margin in a power supplying time until the power is shut down, the ending process may be first performed and, after that, the writing-back process of the writing-back task unit 92 may be performed. In addition, at the power-off time, the ink-associated information is also written in the storage devices 47 of the ink cartridge IC.

For example, when the accidental power shutdown time due to the unplugging of a power plug or the disruption of a power supply 48 or the system down (hang-up or the like) of the controller 40 occurs, if the writing-back process is in progress at the time, the power is shut down in the state where the writing-back process is in progress. In this case, the count value CT of the one of the two counters 141 and 142 has the writing-back completion value B, and the count value CT of the other thereof has a value other than the writing-back completion value B.

After the power shutdown (power off), at the power-on time when the user manipulates the power switch 65 to power on the printer 11, the writing task unit 91 is activated. Hereinafter, the writing process is described with reference to a flowchart illustrated in FIG. 11.

First, at Step S110, it is determined whether or not each count value CT of all the counters 141 and 142 is the writing-back completion value B. If all the count values CT are the writing-back completion value B, the process proceeds to Step S120; and if all the count values CT are not the writing-back completion value B, the process proceeds to Step S130.

At Step S120, it is determined whether or not the updating flag F=1. If the updating flag F=1, the process proceeds to Step S130; and if not the updating flag F=1 (in other words, F=0), the process proceeds to Step S140.

At Step S130, the data D of the first storage area 143 in the non-volatile memory 55 are written in the first storage unit 131 of the RAM 54 (writing process). When the updating flag F=1, since the writing-back site of the writing-back process performed finally before the previous power shutdown is the first storage area 143, the data D from the first storage area 143 are written, so that the latest data D from the non-volatile memory 55 may be written in the first storage unit 131 of the RAM 54. If the writing process is completed, the routine is ended. In other words, the writing task unit 91 is inactivated.

On the other hand, at Step S140, the data D of the first storage area 143 in the non-volatile memory 55 is written in the first storage unit 131 of the RAM 54 (writing process). When the updating flag F=0, since the writing-back site of the writing-back process which is finally performed before the previous-time power shutdown is the second storage area 144, the data D from the second storage area 144 is written, so that the latest data D from the non-volatile memory 55 may be written in the first storage unit 131 of the RAM 54. If the writing process is completed, the routine is ended. In other words, the writing task unit 91 is inactivated.

On the other hand, when the count values CT of all the counters 141 and 142 are not the writing-back completion value B (negative determination at Step S110), at Step S150, the writing-back error is notified. In other words, when a counter of which the count value CT does not reach the writing-back completion value B exists, it denotes that the writing-back of the data D is not completed through the writing-back process which is finally performed before the power shutdown; and therefore, in order to alarm the indication to the user, the writing-back error is notified. The writing task unit 91 performs the writing-back error notice through the main control unit 81, and the main control unit 81 transmits the writing-back error notice through the communication unit 82 to the host control unit 125, so that the writing-back error indication is notified to the host control unit 125. If the host control unit 125 receives the writing-back error notice, the host control unit 125 displays writing-back error occurrence indication (for example, an error screen) on the monitor 123. As a result, the writing-back error occurrence indication is notified to the user.

In the next Step S160, among the two storage areas 143 and 144 in the non-volatile memory 55, the data D of the storage area corresponding to the counter of the side, where the count value CT becomes the writing-back completion value B, are written in the first storage unit 131 of the RAM 54. As a result, the data D for which the writing-back process is finally completed before the previous-time power shutdown are written in the first storage unit 131 of the RAM 54.

In the next Step S170, among the data D of the storage area for which the writing-back is in progress, the data of a portion corresponding to the count value CT is written in the first storage unit 131 of the RAM 54. In other words, with respect to the data D of the storage area corresponding to the counter of the side where the count value CT becomes a value other than the writing-back completion value B among the two storage areas 143 and 144 in the non-volatile memory 55, the data of a portion corresponding to the count value CT, in other words, the data of the portion where the writing-back may be performed at the previous-time power shutdown time, are written in the first storage unit 131 of the RAM 54. Herein, at the previous-time power shutdown time, when the power is shutdown at the in-progress position among one information corresponding to the count value CT of that time among the data D, since the one information may not be reliable due to the stopping of the writing-back, the data D of a portion where information preceding by one from the one information may be reliable is written in the first storage unit 131 of the RAM 54.

As a result of the data recovering process, it is possible to recover new data D in which some data until the writing-back may be completed among the data D of which the writing-back is stopped before the previous-time power shutdown are supplemented with a portion of the one-time old data D of which the writing-back may be completed before the previous-time power shutdown. If the recovering is completed, the writing task unit 91 ends the routine.

At the power-on time, the writing task unit 91 also performs the copying process subsequently to copy the written data D in the first storage unit 131 into the second storage unit. Next, the writing task unit 91 which completes the copying process is inactivated. In addition, in the embodiment of the invention, an example of a recovering unit is configured by the writing task unit 91 which perform the recovering process.

As described above, according to the embodiment, it is possible to obtain the following advantages.

(1) The writing-back task unit 92 alternately performs the writing-back of the data D in the second storage unit 132 of the RAM 54 between a plurality of the storage areas 143 and 144 of the non-volatile memory 55. At this time, the counting process of the counter corresponding to the storage area of the writing-back site among the counters 141 and 142 is performed, so that the count value according to the written-back data amount is set. Next, at the power-on time, the writing task unit 91 writes the data of the storage area corresponding the counter of which the count value CT becomes the writing-back completion value B among a plurality of the counters 141 and 142 in the first storage unit 131 of the RAM 54. Therefore, even when the writing-back process is stopped due to, for example, accidental power shutdown, it is possible to avoid a problem in that the incorrect data of which the writing-back is stopped from being written in the RAM 54. Accordingly, it is possible to write the correct data of which the writing-back is completed from the non-volatile memory 55 into the RAM 54, and furthermore, even when the writing-back process is stopped at the previous-time power shutdown time, it is possible to write relatively new data, which is written back before one-time writing-back at the stopped time, in the RAM 54.

(2) Since the two storage areas 143 and 144 are provided to the non-volatile memory 55 and the writing-back sites of the data D are configured to be switched between the two storage areas 143 and 144, it is possible to secure a relatively large amount of data storage capacity. For example, when three or more storage areas are secured and the storage areas of the writing-back sites are configured to be sequentially switched, the data storage capacity is decreased, so that, for example, a non-volatile memory 55 having a large storage capacity may be prepared. However, since the number of the storage areas is set to two which is the minimum number so that the writing-back sites may be switched, it is possible to secure a relatively large amount of the data storage capacity.

(3) Since the switching is configured to be performed between the two storage areas 143 and 144 provided to the non-volatile memory 55, the counter corresponding to at least one storage area becomes the writing-back completion value B. Therefore, it is possible to write the correct data D from the storage area corresponding to the counter having the writing-back completion value B in the RAM 54. For example, if the writing-back of the data to the other storage area is configured to be started during the writing-back of the data to the one storage area before the completion of the writing-back, a problem that both of the two counters do not have the writing-back completion value B at an accidental power shutdown time occurs. However, since the writing-back of the data to the other storage area is configured to be started after the completion of the writing-back of the data to the one storage area, it is possible to store the correct data, of which the writing-back is completed, in the exactly one storage area. Accordingly, it is possible to write highly-reliable data D, of which the writing-back is completed, in the RAM 54.

(4) Since the writing-back task unit 92 is activated at the power shutdown time of the printer 11 to perform the writing-back process of the latest data D at that time, it is possible to write back the latest data D to the non-volatile memory 55.

(5) At the power-on time, if a counter with the count value CT that is not equal to the writing-back completion value B exists, the writing task unit 91 performs error alarm by noticing a message indicating that such a counter exists to the host control unit 125 and display the writing-back error indication on the monitor 123 (notifying unit). As a result, the user may recognize that the writing-back process at the previous-time power shutdown time may fail (in other words, that the data of the non-volatile memory 55 may be incorrect) through the error notifying. Therefore, the user may recognize the necessity of the data recovery.

(6) When a counter having a count value CT other than the writing-back completion value B exists and the error notifying is performed, the writing task unit 91 supplements some data, of which the writing-back is completed among the writing-back is stopped, with a portion of the one-time old data of which the writing-back is completed, so that relatively new data are recovered. A portion of the data of which the writing-back is completed is used, so that it is possible to acquire recovered data where the latest data are used for at least the portion.

(7) For example, if a configuration where a flag is employed to switch the counter is used, when the writing-back process is stopped, although it may not be checked at which position in the data D the writing-back is stopped, since there are the counters 141 and 142, it is possible to specify the position of the data D, where the writing-back process is stopped, from the count value CT. As a result, it is possible to perform an appropriate recovering process by using a portion of the data of which the writing-back is stopped, so that it is possible to improve reliability of the recovered data.

(8) The writing task unit 91 of which the priority is higher than that of the printing system task unit copies the data D in the first storage unit 131 into the second storage unit 132 where the writing of the printing system task unit is prohibited, and the writing-back task unit 92 writes the data D in the second storage unit 132 back to the non-volatile memory 55, so that it is possible to write the correct data D back to the non-volatile memory 55. For example, even when a task having a high priority is activated during the writing-back, the data D in the second storage unit 132 are not rewritten. Therefore, after that, when the writing-back task unit 92 is activated to restart the writing-back process of the data subsequently to the stopped writing-back process, it is possible to perform the writing-back on the same data in the previous writing-back and the current writing-back. Accordingly, although the writing-back process is intermittently performed as several divided writing-back processes due to the stopping caused by the interrupt of the printing system task unit, it is possible to write the correct data D back to the non-volatile memory 55.

(9) Since the priority of the writing task unit 91 is set to be higher than that of the printing system task unit, the copying of the data D from the first storage unit 131 into the second storage unit 132 may be performed prior to the printing system task unit. Therefore, it is possible to avoid a problem in that the copying of the writing task unit 91 is stopped due to the activation of the printing system task unit, so that the original copying data D is rewritten during the copying. Accordingly, it is possible to correctly copy the data of the first storage unit 131 into the second storage unit 132.

(10) The writing task unit 91 starts copying of the data D by using the writing-back completion notice received from the writing-back task unit 92 as a trigger. Therefore, it is possible to avoid a problem in that the original writing-back data is rewritten during the writing-back of the writing-back task unit 92. Accordingly, it is possible to write the correct data D back to the non-volatile memory 55.

(11) The priority of the writing-back task unit 92 is set to be lower than those of the printing system task units 81 to 89. Therefore, In the middle of a generating process for ejection system data such as printing image data and head control data and a transmission process for transmitting the ejection system data to the recording heads 29, the interrupt of the writing-back task unit does not occur and the recording head system process is performed prior to the writing-back process. Therefore, it is possible to reduce the occurrence frequency of bad ejection (dot missing), for example, where ejection system data are not coincident in time and ink is not ejected from the nozzles or the frequency of delay of the activation timing of the carriage 27 due to delay of the preparation of the head control data down to the lowest possible level thereof. Accordingly, the bad printing caused by the bad ejection is prevented from occurring, and the delay occurrence frequency of the activation timing of the carriage 27 is reduced, so that it is possible to suppress the deterioration in printing throughput.

In addition, in the standby status of the printer 11 where a predetermined operation such as a printing operation (recording system operation and transport system operation) or a cleaning operation is not performed, the writing-back process of the data D is performed. Accordingly, the interrupt of the writing-back process does not occur in the middle of the printing system process, and the printing system process is performed prior to the writing-back process, so that it is possible to suppress the deterioration in the printing throughput.

(12) At the power-off time, the urgent task unit 90 requests the real-time OS 71 to change the task priority, and the priority management table 97 is updated with task priority (FIG. 5B) of the power-off time. Due to the change in the priority, the relationship of the priority between the writing task and the writing-back task is maintained, and the priorities of the two tasks is maintained to be higher than that of the printing system task. Therefore, at the power-off time, the writing-back task unit 92 may be activated, so that as new data D as possible may be written back to the non-volatile memory 55. In addition, at power shutdown time, since the priority of the writing task unit 91 is set to higher than that of the writing-back task unit 92, for example, although the power shutdown is detected during the copying, it is possible to start the writing-back of the data D after the copying is completed. For example, if the priority of the writing-back task unit 92 is set to be higher than that of the writing task unit 91, when the power is shutdown during the copying, the data D of which the copying is in progress are written back, so that the reliability of the data D is lost. On the contrary, in the embodiment of the invention, although the power is shutdown during the copying, it is possible to perform the writing-back of the correct data D, of which the copying is completed, to the non-volatile memory 55.

Second Embodiment

Next, a second embodiment is described with reference to FIGS. 12 to 18. A printer according to the embodiment has a configuration where a plurality of controllers for controlling recording heads are disposed, so that the plurality of recording heads are controlled by the plurality of controllers in a divisional manner.

Figure 12:
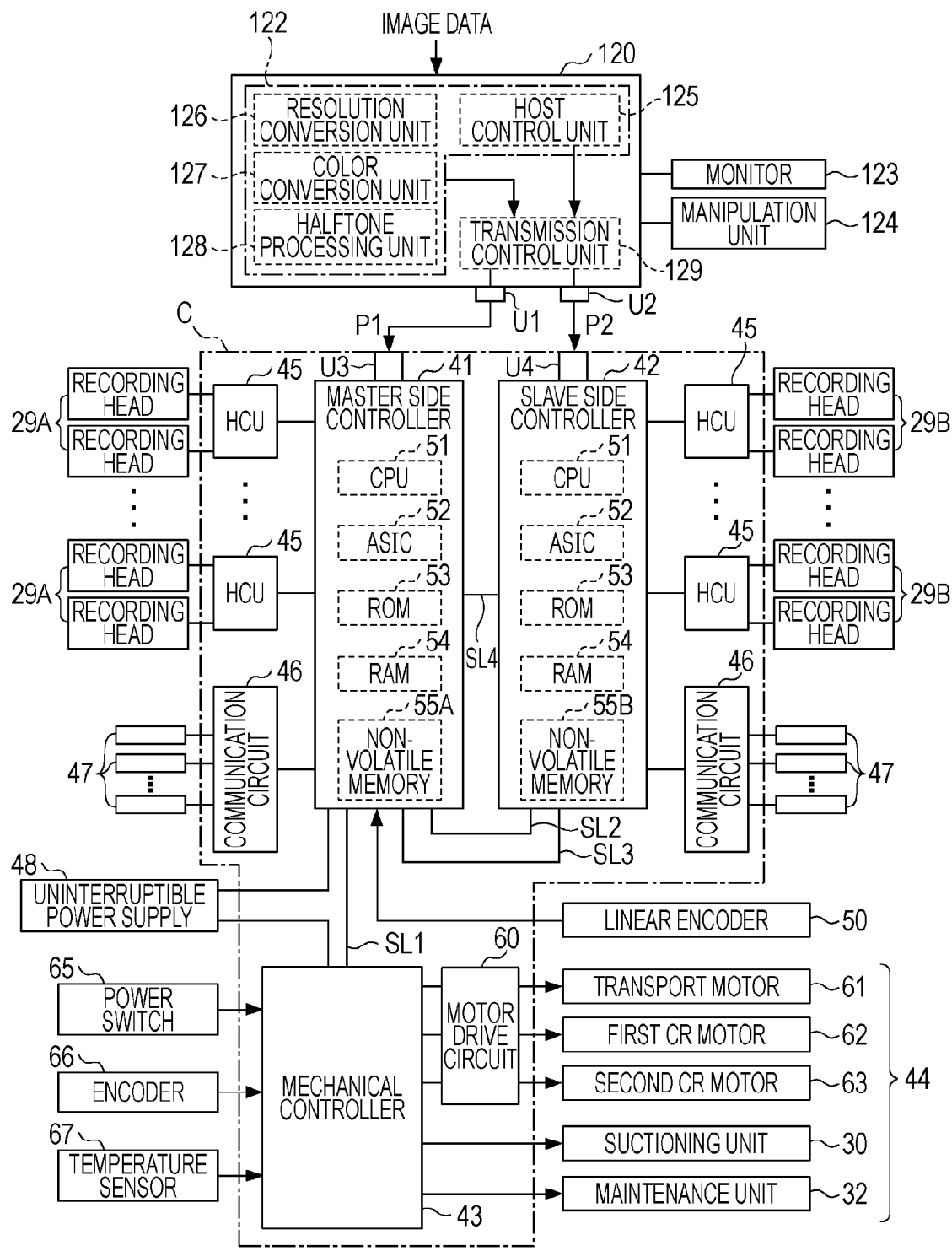
FIG. 12 is a block diagram illustrating an electrical configuration of a printing system according to a second embodiment.

FIG. 12 is a block diagram illustrating an electrical configuration of a printer according to the embodiment of the invention. A control unit C of the printer 11 according to the embodiment includes a plurality (in this example, two) of controllers 41 and 42 which control the recording heads 29 in a divisional manner. The master side controller 41 performs ejection control (recording control) of a plurality (for example, seven) of the recording heads 29A, and the slave side controller 42 performs ejection control (recording control) of a plurality (for example, eight) of the recording heads 29B.

The printer driver 122 in the host apparatus 120 divides the printing image data to two data according to the arrangement positions (recording areas) of the recording heads 29 allocated to the two controllers 41 and 42 and attaches the same printing language description command to the divided printing image data to generate two printing data P1 and P2. The host apparatus 120 allows the transmission control unit 129 to perform serial transmission of the printing data P1 to the master side controller 41 through communication between the serial communication ports U1 and U3 and to perform serial transmission of the printing data P2 to the slave side controller 42 through communication between the serial communication ports U2 and U4.

In addition, each of the communication circuits 46 connected to the two controllers 41 and 42 is connected to the four storage devices 47, that is, the half of the eight storage devices 47 mounted on the eight ink cartridges IC1 to IC8. The master side controller 41 communicates with the storage devices 47 mounted on the four ink cartridges IC1 to IC4, and the slave side controller 42 communicates with the storage devices 47 mounted on the four ink cartridges IC5 to IC8. Similar to the first embodiment, in the storage device 47, various types of the ink-associated information such as ink remaining amount information, ink color, use-by date, maintenance information, or part number are stored in the corresponding ink cartridge IC.

The master side controller 41 communicates with the storage devices 47 of the ink cartridges IC1 to IC4 through the communication circuit 46, so that the reading and writing of the ink-associated information may be performed. Similarly, the slave side controller 42 communicates with the storage devices 47 mounted on the ink cartridges IC5 to IC8 through the communication circuit 46, so that the reading and writing of the ink-associated information may be performed.

In this manner, the configuration of each of the controllers 41 and 42 is basically the same as that of the first embodiment except that the number of the controllers which control and manage the recording heads 29 and the ink cartridges IC is different. Similar to the first embodiment, each of the controllers 41 and 42 includes a CPU 51, an ASIC 52, a ROM 53, a RAM 54, and a non-volatile memory 55. In FIG. 12, in order to distinguish the non-volatile memories 55 of the master side and the slave side, the non-volatile memory of the master side is denoted by 55A, and the non-volatile memory of the slave side is denoted by 55B. In addition, since the recording heads 29 are controlled in a divisional manner, it is necessary to synchronize the command output timing between the two controllers 41 and 42, and the two controllers 41 and 42 have a synchronizing process function. This configuration is different from the first embodiment. The synchronizing process function is described later.

As illustrated in FIG. 12, in the embodiment of the invention, the master side controller 41 is connected to the mechanical controller 43 through the communication line SL1. In addition, the output signal of the linear encoder 50 is input to the master side controller 41 and transmitted from the master side controller 41 through a signal line SL2 to the slave side controller 42. In addition, the two controllers 41 and 42 are connected to each other through the communication line SL3 so as to implement the synchronizing process function. In addition, since the ink cartridges IC are managed in a divisional manner, in order to transmit the ink consumption amount corresponding to the ink color of the ink cartridge managed by the counterparty controller among the ink consumption amount consumed by the recording heads 29 managed by the controller of interest to the counterparty controller, the two controllers 41 and 42 are communicatably connected to each other through the communication line SL4.

In the stage where the printing of the seven recording heads 29A managed by the master side controller 41 may be prepared (in other words, the printing image data used for ink droplet ejection control are prepared) and the printing of the eight recording heads 29B managed by the slave side controller 42 may also be prepared, the master side controller 41 transmits the carriage activation command to the mechanical controller 43. Therefore, it is possible to avoid an ejection problem where ink droplets are not ejected irrespective of whether the recording heads 29 reach the ejection position due to the activation of the carriage 27 before the completion of the printing preparation of the one of the controllers 41 and 42.

In addition, in the stage where the printing of the seven recording heads 29A managed by the master side controller 41 is completed and the printing of the eight the recording heads 29B managed by the slave side controller 42 are also completed, the master side controller 41 transmits the transport command which instructs the transporting of the sheet 13 to the mechanical controller 43. Therefore, it is possible to avoid a problem where the landing position of the ink droplets ejected from the recording heads 29 on the sheet 13 shifts due to the transport starting of the sheet 13 (or the releasing of the suctioning of the sheet on the supporting member 19) in the stage before the completion of the printing of the one of the controllers 41 and 42.

In this manner, the master side controller 41 has the aforementioned synchronizing process function for transmitting the command in synchronization with the progress of the slave side controller 42. In the synchronizing process function, the slave side controller 42 outputs the command to the master side controller 41, and at the time when the master side controller 41 determines that the command received by the slave side and the command of the master side controller 41 are aligned and the contents of the commands are the same, master side controller 41 outputs the command to the mechanical controller 43. In the embodiment of the invention, in order to implement the synchronizing process function, the configurations installed in the controllers 41 and 42 are slightly different between the master side and the slave side.

Figure 13:
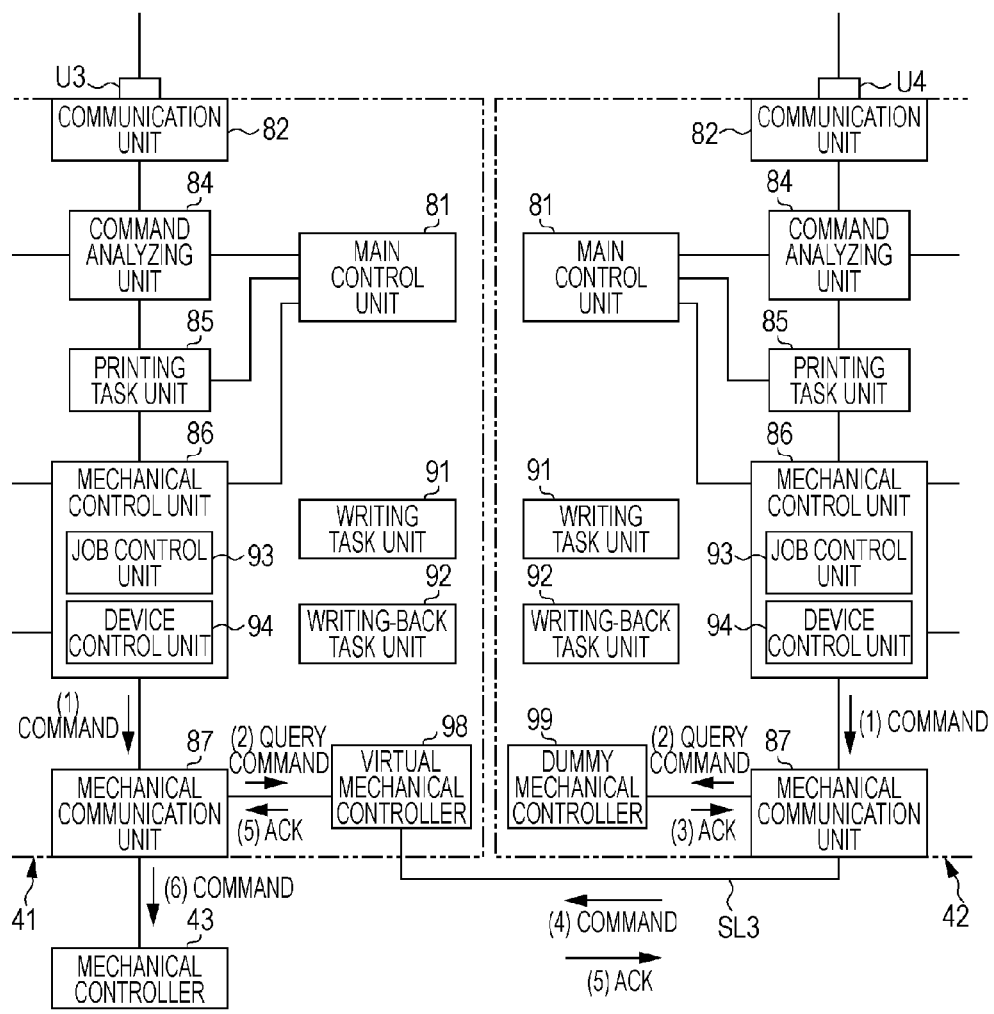
FIG. 13 is a block diagram illustrating a functional configuration associated with a synchronizing process function of a plurality of controllers.

FIG. 13 is a block diagram illustrating functional configurations of the master side controller 41 and the slave side controller 42. As illustrated in FIG. 13, the two controllers 41 and 42 are implemented as the same program configuration. However, since some programs through which only the synchronizing process function portion is activated are different, different functions are implemented. In addition, in FIG. 13, only the functional blocks of the command processing system and the synchronizing processing system are illustrated, and the real-time OS 71, the image processing unit 83, the head control unit 88, the ink management unit 89, the urgent task unit 90, and the like are omitted.

As illustrated in FIG. 13, similar to the controller 40 according to the first embodiment of the invention, each of the controllers 41 and 42 includes the real-time OS 71, the main control unit 81, the communication unit 82, the image processing unit 83, the command analyzing unit 84, the printing task unit 85, the mechanical control unit 86, the mechanical communication unit 87, the head control unit 88, the ink management unit 89, the urgent task unit 90, the writing task unit 91, and the writing-back task unit 92.

Furthermore, in the embodiment of the invention, in order to implement the synchronizing process function, the master side controller 41 includes a virtual mechanical controller 98 as an example of a synchronizing unit, and the slave side controller 42 includes a dummy mechanical controller 99 as an example of a synchronizing unit.

In addition, the mechanical communication unit 87 of the slave side controller 42 is connected to the virtual mechanical controller 98 of the master side controller 41 through the communication line SL3. In other words, the mechanical communication unit 87 of the master side controller 41 is connected to the actual mechanical controller 43, and the mechanical communication unit 87 of the slave side is connected to the virtual mechanical controller 98 installed in the master side controller 41. When the mechanical communication unit 87 of the slave side intends to output a command to the mechanical controller 43, the mechanical communication unit 87 actually transmits the command to the virtual mechanical controller 98.

Next, a synchronizing process function is described. The device control unit 94 outputs the command, which is received from the job control unit 93, to the mechanical communication unit 87 ((1) in FIG. 13). If the mechanical communication unit 87 receives the command, the mechanical communication unit 87 sends the query of the command to the virtual mechanical controller 98 in the master side ((2) in FIG. 13) and sends the query of the command to the dummy mechanical controller 99 in the slave side ((2) in FIG. 13).

In the slave side, If the dummy mechanical controller 99 receives the query, the dummy mechanical controller 99 unconditionally immediately responds with an ACK signal ((3) in FIG. 13). If the mechanical communication unit 87 of the slave side receives the response, the mechanical communication unit 87 output the command to the communication line SL3 ((4) in FIG. 13). The output command is received by the virtual mechanical controller 98 of the master side.

If the virtual mechanical controller 98 receives the commands from the two mechanical communication units 87 of the master side and the slave side, it is determined whether or not the two commands are the same. If the two commands are the same, the virtual mechanical controller 98 responds to the mechanical communication unit 87 of the master side with the ACK signal ((5) in FIG. 13). Next, if the mechanical communication unit 87 of the master side receives the response to the ACK signal, the mechanical communication unit 87 transmits the command to the mechanical controller 43 ((6) in FIG. 13). In other words, in the synchronizing process of the virtual mechanical controller 98, at the timing when it is determined that the same commands are aligned to both of the master side and the slave side, the command is transmitted from the mechanical communication unit 87 of the master side to the mechanical controller 43. In addition, when the mechanical communication unit 87 outputs the command to the mechanical controller 43, the mechanical communication unit 87 transmits the response indicating the output of the command to the mechanical control unit 86. If the mechanical control unit 86 receives the response indicating the output of the command, the mechanical control unit 86 outputs the next command.

Figure 14:
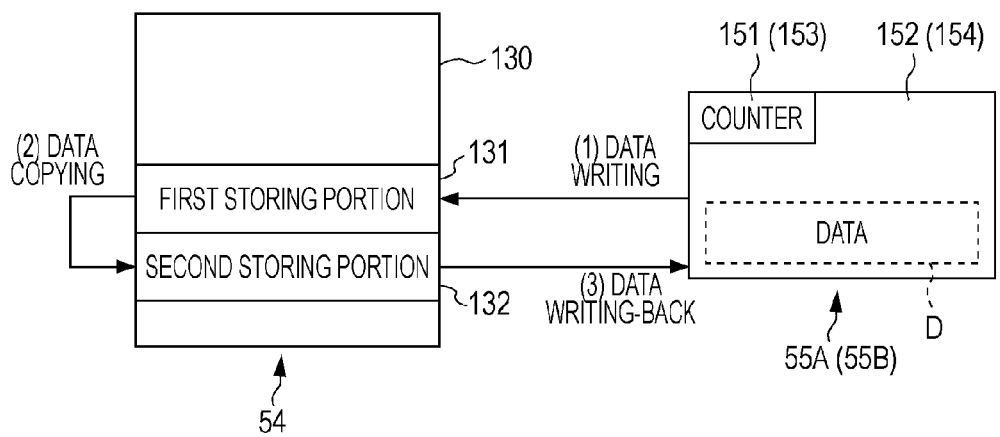
FIG. 14 is a block diagram illustrating a data storage process.

FIG. 14 illustrates configurations of the RAM and the non-volatile memory according to the embodiment. In the embodiment of the invention, in both of the master side and the slave side, the configurations of the RAM and the non-volatile memory are the same. In FIG. 14, the RAM 54 and the non-volatile memory 55A in the master side controller 41 are illustrated. In addition, in FIG. 14, the reference numerals of the configurations corresponding to the non-volatile memory 55B of the slave side controller 42 are illustrated in bracket.

As illustrated in FIG. 14, similar to the first embodiment, the RAM 54 includes a program data storage unit 130, a first storage unit 131 (mirror storage area unit), and a second storage unit 132 (copying storage area unit).

The first storage unit 131 (mirror storage area unit) is a storage area which is a writing site of the data D read from the non-volatile memory 55, and the printing system task units 81 to 89 are storage areas which the urgent task unit 90 accesses to perform data reading and writing.

The second storage unit 132 (copying storage area unit) is a storage area which is a copying site of the data D read from the first storage unit 131. Although the writing access of the writing task unit 91 to the second storage unit 132 and the reading access of the writing-back task unit 92 to the second storage unit 132 are permitted, the writing access of each of the task units 81 to 90 to the second storage unit 132 is prohibited.

In addition, as illustrated in FIG. 14, the non-volatile memory 55A (55B) according to the embodiment is provided with one counter 151 (153) as an example of the counting unit and one storage unit 152 (154) for storing the data D. In the second embodiment, each of the storage units 152 and 154 of the non-volatile memories 55A and 55B installed in each of the controllers 41 and 42 constitutes an example of a plurality of the storage units. Therefore, in this example, the plurality of storage units comprise two storage units.

As illustrated in FIG. 14, at the power-on time, the writing process of the data D from the non-volatile memory 55 into the first storage unit 131 of the RAM 54 is performed by the writing task unit 91 ((1) in FIG. 14)) (writing stage). In other words, at the power-on time, the writing task unit 91 reads the data D, which are stored in the non-volatile memory 55 at the previous-time power-off time (power shutdown time), from the non-volatile memory 55 and writes the read data D in the first storage unit 131 of the RAM 54.

The writing task unit 91 also performs the copying process subsequently to the writing process at the only the writing process time of the power-on time to copy the data D in the first storage unit 131 into the second storage unit 132 ((2) in FIG. 14) (copying stage).

After that, if the printer 11 is in the standby status, the writing-back task unit 92 having the lowest priority among the task units 81 to 92 is activated. Next, the writing-back task unit 92 writes the data D in the second storage unit 132 back to the non-volatile memory 55 ((3) in FIG. 14)) (writing-back stage). Before the writing-back process, the values of the counters 151 and 153 are changed into the writing-back starting value A. During the writing-back of the data D, when the writing-back task unit 92 performs the writing-back of the data of K bytes, the writing-back task unit 92 performs the counting process of incrementing the counter 151 (153).

If the writing-back task unit 92 performs the writing-back of all the data D to complete the writing-back process, the count value CT of the counter 151 (153) becomes the writing-back completion value B (for example, a maximum value). If the writing task unit 91 receives the writing-back completion notice from the writing-back task unit 92 which completes the writing-back process, the writing task unit 91 is activated to perform the copying process of copying the data D from the first storage unit 131 into the second storage unit 132 ((2) in FIG. 14).

Since the writing task unit 91 is a task unit of which the priority is higher than that of the printing system task unit, if writing task unit 91 receives the writing-back completion notice, in general cases, the writing task unit 91 is immediately activated. At the time of the writing-back, when the writing task unit 91 receives the writing-back completion notice transmitted from the writing-back task unit 92, the writing task unit 91 is activated to copy the data D in the first storage unit 131, which are updated in the time interval between the previous-time copying time and the current copying time, into the second storage unit 132 ((2) in FIG. 14). After the copying process, when the printer 11 is in the standby status, the writing-back task unit 92 is activated to write the data D in the second storage unit 132 back to the non-volatile memory 55 ((3) in FIG. 14).

In addition, at the power-off time (power shutdown time) such as the power off manipulation time, the unplugging of a power plug, or the disruption of a power supply, the priority changing unit 73 changes the priority management table 97 into the priority illustrated in FIG. 5B, that is, the priority in which the priority (in this example, the third priority) of the writing-back task unit 92 is set to be higher than those of the printing system task units 81 to 89. Therefore, in the embodiment, at power-off time (power shutdown time), the writing-back task unit 92 is also activated.

Figure 15:
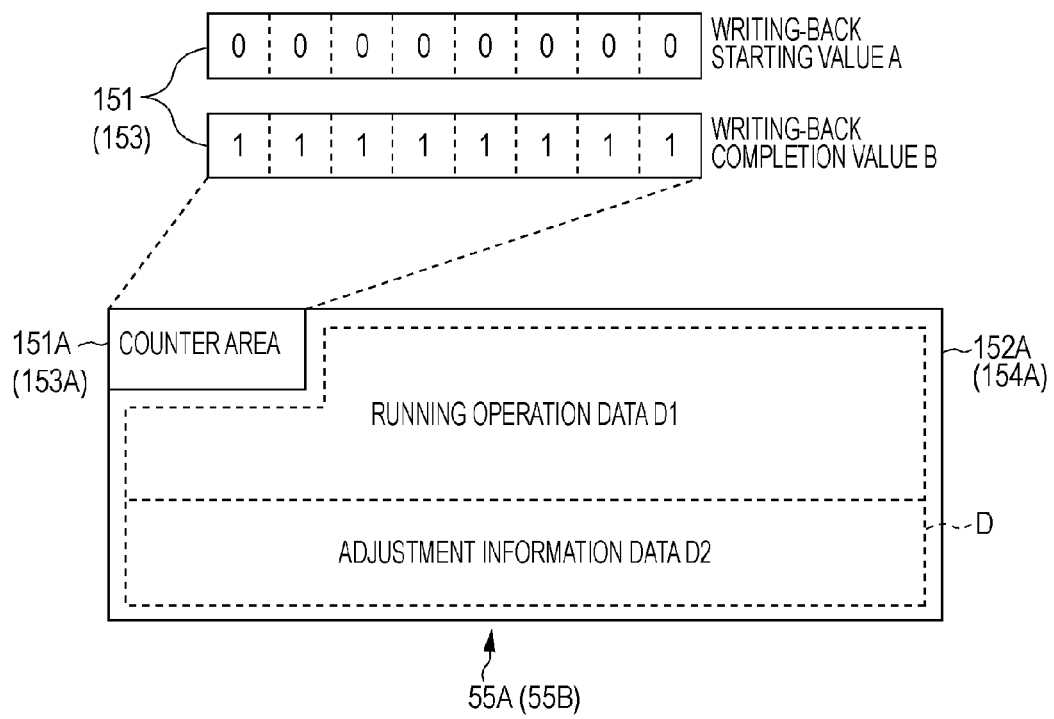
FIG. 15 is a schematic diagram illustrating a configuration of a non-volatile memory.

FIG. 15 illustrates configurations of the non-volatile memory 55. As illustrated in FIG. 15, the non-volatile memory 55A (55B) includes a counter area 151A (153A) used as the counter 151 (153) and a storage unit 152 (154) for storing the data D (backup data). Although the counter area 151A (153A) is configured as a writing prohibited area of the printing system task unit, the writing access of the writing task unit 91 and the writing-back task unit 92 to the counter area 151A (153A) is configured to be permitted. Therefore, the process (resetting, setting, counting processes or the like) for changing the count value of the counter 151 (153) by the writing task unit 91 and the writing-back task unit 92 may be performed.

Similar to the first embodiment, for example, 1 byte is secured for the counter area 151A (153A), so that an 8-bit counter 151 (153) is configured. In the embodiment, K bytes (K=(data capacity of data D)/255), which are the value formed by dividing the data size of the data D by 255, are set as a unit of the counting process for counting only the "1" in the counter 151 (153). The writing-back starting value A is set to the minimum value "00000000" (binary number), and the writing-back completion value B of the time when the writing-back of all the data D is completed is configured to be maximum value "11111111" (binary number). In addition, the data D include operation information data D1 and adjustment information data D2. Similar to the first embodiment, the operation information data D1 of which the updating frequency is relatively high are stored in the area of the writing-back starting side in the storage unit 152 (154), and the adjustment information data D2 of which the updating frequency is relatively low are stored in the area of the writing-back ending side in the storage unit 152 (154). In addition, in the embodiment of the invention, in some cases, the storage unit 152 in the non-volatile memory 55 of the master side may be referred to as a first storage unit, and the storage unit 154 in the non-volatile memory 55 of the slave side may be referred to as a second storage unit.

Hereinafter, the writing-back process which the writing-back task unit 92 is activated to perform in each of the controllers 41 and 42 is described with reference to a flowchart illustrated in FIG. 16. After the copying process, when the printer 11 is in the standby status, each of the writing-back task units 92 of the controllers 41 and 42 is activated. Although the controllers 41 and 42 are asynchronously operated, each of the task units is activated in coincidence with the timing where the printer 11 performs the printing operation or the timing where the printer 11 is in the standby status. Therefore, in each of the controllers 41 and 42, the writing task unit 91 and the writing-back task unit 92 are activated in the same manner. In addition, hereinafter, the writing-back process in the master side controller 41 is described, and the corresponding reference numerals in the slave side are illustrated in bracket.

Figure 16:
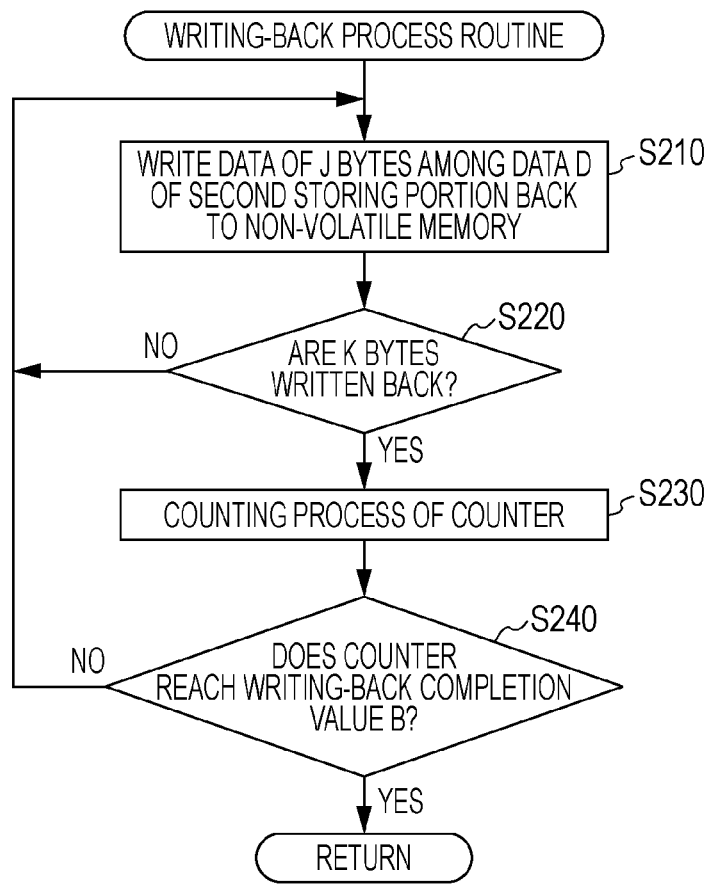
FIG. 16 is a flowchart illustrating a writing-back process.
Figure 17:
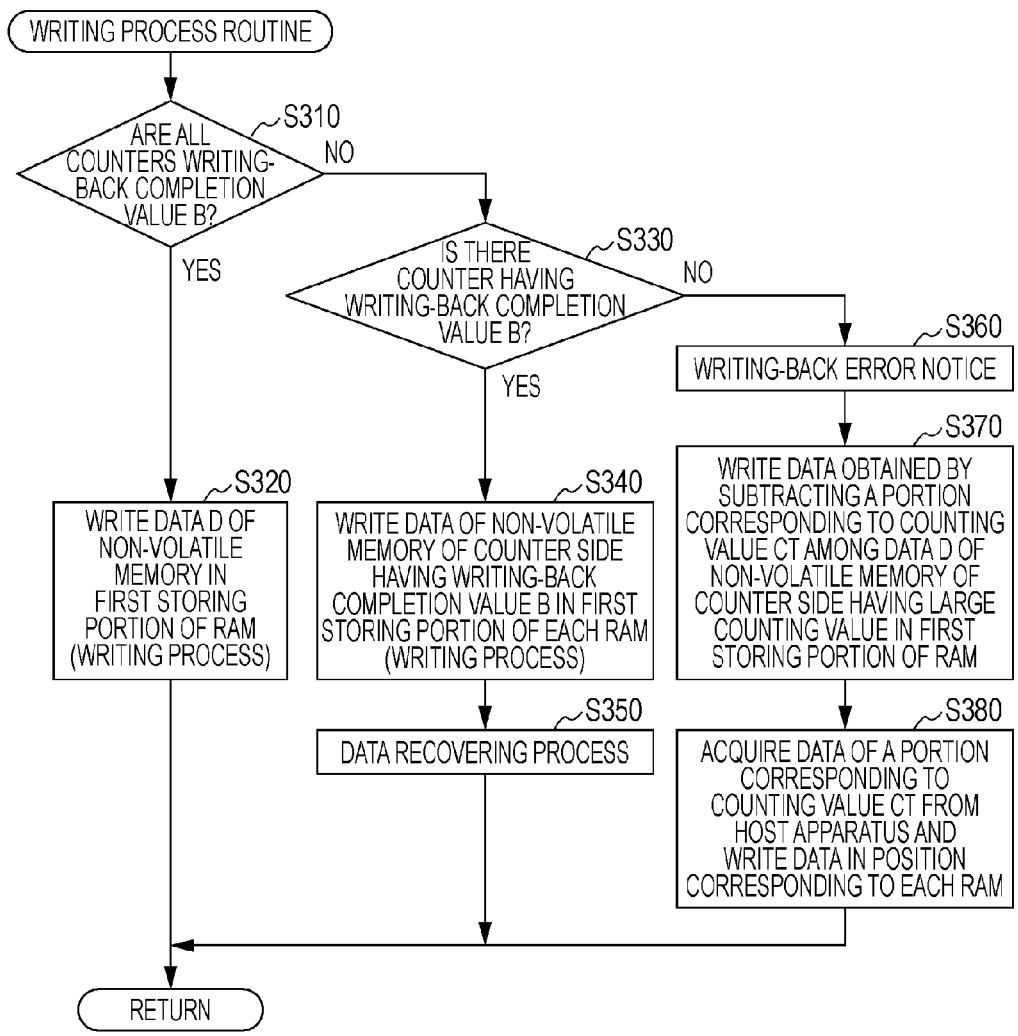
FIG. 17 is a flowchart illustrating a writing process.

First, at Step S210 in FIG. 16, the data of J bytes among the data D in the second storage unit 132 are written back to the non-volatile memory 55. At this time, when the data D newly copied in the second storage unit 132 are written back, after the count value CT of the counter is changed into the writing-back starting value A, the writing-back is sequentially performed from the first portion of the data D by J bytes. In addition, when the same data D are written back as a continuation of the stopped previous writing-back, the writing-back is sequentially performed from the position corresponding to the count value CT at that time by J bytes. In addition, the changing of the counter into the writing-back starting value A may be performed by the writing task unit 91 at the copying process completion time.

In the next Step S220, it is determined whether or not K bytes are written back. If the K bytes are not written back, the data of the next J bytes are written back to the non-volatile memory 55 (S210). Next, if the n-times writing-back of J bytes is repeated so that K (=J×n) bytes are written back (affirmative determination at Step S220), the process proceeds to Step S230.

At Step S230, the counting process of the counter 151 (153) is performed. In this example, as the counting process, the count value CT of the counter 151 (153) is incremented by "1".

Next, at Step S240, it is determined whether or not the count value CT of the counter 151 (153) reaches the writing-back completion value B. Similar to the following description, if the count value CT does not reach the writing-back completion value B, the process returns to Step S210 to repeat the processes of Steps S210 to S240 until the count value CT reaches the writing-back completion value B (affirmative determination in S240). As a result, when the writing-back of K bytes is completed, the counter 151 (153) is incremented through the counting process. Therefore, if the writing-back of all the data D to the non-volatile memory 55 is ended, the count value CT of the counter 151 (153) reaches the writing-back completion value B (affirmative determination in S240). After the writing-back completion notice is transmitted to the writing task unit 91, the routine is ended. In other words, the writing-back task unit 92 is inactivated. In addition, when the writing-back process performed as a process of the power shutdown time (power-off time) is ended, the writing-back completion notice is transmitted to the urgent task unit 90. In addition, during the writing-back process, if there is interrupt of another task unit of which the priority is higher than that of the writing-back task unit 92, although the count value CT of the counter 151 (153) does not reach the writing-back completion value B, the writing-back task unit 92 proceeds to the ready status at that time, so that the writing-back process is stopped.

Next, the data storage process at the power shutdown (power off) time is described. For example, in an accidental power shutdown time, the data storage process may be performed in a predetermined time interval until the secondary battery provided to the printer 11 is discharged. The accidental power shutdown is detected by the power shutdown detection function of the urgent task unit 90 in each of the controllers 41 and 42.

If the power shutdown is detected, the urgent task unit 90 is activated, so that the urgent task unit 90 performs priority changing request to the real-time OS 71. Therefore, the priority changing unit 73 performs the task priority changing process. As a result, the priority management table 97 which is referred to by the task management unit 74 is changed from the normal-time task priority illustrated in FIG. 5A to the power-off time task priority illustrated in FIG. 5B.

Therefore, in the power shutdown time, the writing-back task unit 92 is activated. However, when the power is shutdown during the copying process, after the writing task unit 91 having a higher priority completes the copying process, the writing-back task unit 92 having the next higher priority is activated. Next, the writing-back task unit 92 performs the writing-back process for the copied data D (Steps S210 to S240 in FIG. 16). In addition, when the power is shutdown during the writing-back process, the writing-back process for the data D is performed from the position where the writing-back corresponding to the count value CT at that time is stopped (Steps S210 to S240 in FIG. 16). At this time, when the writing-back process may be completed up to the final stage, the count value CT of the counter 151 (153) becomes the writing-back completion value B (CT=B). At this time, the correct data D for which the writing-back process is completed are stored in the non-volatile memory 55A (55B). On the other hand, when the writing-back process may not be completed up to the final stage, the count value CT of the counter 151 (153) becomes a value other than the writing-back completion value B (CT≠B). At this time, there may be a problem in that the incorrect data D for which the writing-back is in progress are stored in the non-volatile memory 55A (55B).

For example, when the accidental power shutdown due to the unplugging of a power plug or the disruption of a power supply 48 or the system down (hang-up or the like) of the controller 40 occurs, if the writing-back process is in progress at the time, there is a case where the power is shutdown in the state where the writing-back process is in progress. In this case, since the controllers 41 and 42 are asynchronous, the count value CT of the one of the counters 151 and 153 may have the writing-back completion value B, and the count value CT of the other may have a value other than the writing-back completion value B. In addition, all the count values CT of the counters 151 and 153 may have values other than the writing-back completion value B.

After the power shutdown (power off), at the power-on time when the user manipulates the power switch 65 to supply power to the printer 11, the writing task unit 91 is activated. Hereinafter, the writing process is described with reference to a flowchart of FIG. 17.

First, at Step S310, it is determined whether or not each of the count values CT of all the counters 151 and 153 is the writing-back completion value B. If all the count values CT are the writing-back completion value B, the procedure proceeds to Step S320; and if all the count values CT are not the writing-back completion value B, the procedure proceeds to Step S330.

At Step S320, the data D of the non-volatile memory 55A (55B) are written in the first storage unit 131 of the RAM (writing process). The correct data D for which the writing-back process finally performed before the previous-time power shutdown is completed may be written in the first storage unit 131 of the RAM 54. If the writing process is completed, the routine is ended. In other words, the writing task unit 91 is inactivated.

On the other hand, at Step S330, it is determined whether or not there is a counter of which the count value CT is the writing-back completion value B. If there is a counter of which the count value CT is the writing-back completion value B, the procedure proceeds to Step S340; and if there is no counter of which the count value CT is the writing-back completion value B, the procedure proceeds to Step S360.

At Step S340, among the non-volatile memories 55A and 55B, the data D of the non-volatile memory of the counter side which has the writing-back completion value B as the count value CT are written in the first storage unit 131 of the RAM 54 (writing process).

In the next Step S350, the data recovering indication is notified. For example, the writing task unit 91 notices the data recovering indication to the host control unit 125 through the main control unit 81, and the host control unit 125 which receives the notice displays the data recovering indication on the monitor 123, so that the alarming is performed. Herein, the notice of the data recovering indication is performed so as to alarm the indication where the writing-back process is not completed by the one controller, and at this time, the data D are correctly recovered. The alarming of the data recovering indication is ended, the writing task unit 91 is inactivated. In addition, the writing process of Step S340 may be performed when the selective items for allowing the user to select the performing of the data recovering process are displayed on the monitor 123 and the indication of the data recovering performing is selected and manipulated through the manipulation of the manipulation unit 124.

On the other hand, when there is no counter which has the writing-back completion value B as the count value CT, at Step S360, the writing-back error is notified. For example, the writing task unit 91 notices the error indication to the host control unit 125 through the main control unit 81, and the host control unit 125 which receives the notice displays the error indication on the monitor 123, so that the alarming is performed.

Next, the data recovering process is performed through the following Steps S370 and S380.

At Step S370, the data D excluding a portion of the position corresponding to the count value CT among the data D of the non-volatile memory in the counter side of which the count value CT is large among the non-volatile memories 55A and 55B are written in the first storage unit 131 of the RAM 54 of each of the controllers 41 and 42.

In the next Step S380, the data of the portion corresponding to the count value CT are acquired from the host apparatus 120, and the acquired data are written in the position (address) corresponding to the count value CT in each of the RAMs 54 of the controllers 41 and 42. In addition, in the printer 11 according to the embodiment, since each of the controllers 41 and 42 periodically transmits the data D to the host control unit 125, the data D which are finally transmitted before the previous-time power shutdown are stored in the host storage unit 120M in the host apparatus 120. Therefore, only the information of a portion of the position corresponding to the count value CT is recovered by using the data D stored in the host storage unit 120M.

In this manner, the data D which are recovered through the data recovering process are written in each of the RAMs 54 of the controllers 41 and 42. If the writing process is ended, the writing task unit 91 is inactivated. After the writing process is ended, the writing task unit 91 is immediately activated to subsequently perform the copying process. In addition, for example, a selective item for allowing the user to select the performing of data recovering process may be displayed on the error display screen when the alarming is performed at Step S360; and when the indication of the performing of the data recovering is selected and manipulated through the manipulation of the manipulation unit 124, the process may proceed to the next Step S370.

Figure 18:
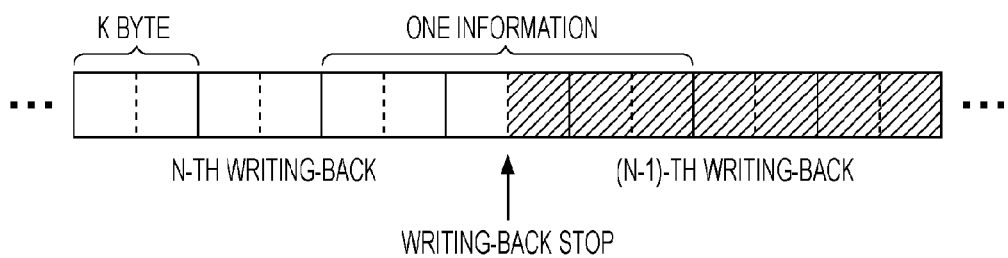
FIG. 18 is a schematic diagram illustrating data at the time when the writing-back process is stopped.

Herein, the reason for recovering only the position corresponding to the count value CT by using the data D stored in the host storage unit 120M is as follows. FIG. 18 illustrates portions neighboring the stopped position of the data D of the writing-back site when the writing-back process is stopped. As illustrated in FIG. 18, when the writing-back process is stopped, the data D (hatching portion in FIG. 18) of the previous-time performed (N−1)-th writing-back are overwritten by the data D of the currently-perform N-th writing-back. As illustrated in FIG. 18, when the writing-back is stopped at a position, since the writing-back is performed up to the mid-portion of one information, the data of the previous-time old information and the data of the current new information are mixed in the one information, so that there may be a problem in that incorrect information is formed. Therefore, with respect to the previous one-time portion from the one information of which the writing-back is stopped, the current (N-th) new information is employed, and with respect to the next one-time portion from the one information, the previous ((N−1)-th) one-time old information is employed. In addition, with respect to the information of the writing-back stopped position corresponding to the count value CT, the data D, which are periodically or non-periodically transmitted from each of the controllers 41 and 42 to the host apparatus 120 and stored in the host storage unit 120M, are used, so that the data D are recovered.

In the writing-back process of the data D, the writing-back of the operation information data D1 having a relatively high updating frequency is first performed, and after that, the writing-back of the adjustment information data D2 having a relatively low updating frequency is performed. Therefore, the data formed by using the previous ((N−1)-th) one-time old data are likely to be the adjustment information data D2 having a relatively low updating frequency. Therefore, although one-time old data are used, the same information as substantially new information is likely to be received.

According to the second embodiment, it is possible to obtain the following advantages.

(13) In the printer 11 including a plurality of the controllers 41 and 42 which control the printing unit in a divisional manner, at the power-on time, the count values CT of the counters 151 and 153 are checked, and the data D of the non-volatile memory of the counter side of which the count value CT becomes the writing-back completion value B among the non-volatile memories 55A and 55B is written the first storage unit 131 of the RAM 54. Accordingly, at the power-on time, it is possible to write the correct data from the non-volatile memory into the RAM 54.

(14) At the power-on time, the one of the counters 151 and 153 does not have the writing-back completion value B, the data D of the non-volatile memory of the counter side of which the count value CT becomes the writing-back completion value B are written in the first storage unit 131 of each of the RAMs 54 of the controllers 41 and 42. Accordingly, even when the writing-back process is stopped by the one of the controllers 41 and 42 due to accidental power shutdown or the system down (for example, hang-up or the like), it is possible to write the correct data D in the first storage unit 131 of the RAM 54 of the one controller by using the data D of the non-volatile memory of the other controller.

(15) At the power-on time, when both of the counters 151 and 153 do not have the writing-back completion value B, information of the position corresponding to the count value CT among the data D stored in the host storage unit 120M is compensated for the data D excluding a portion of information corresponding to the count value CT among the data D of the non-volatile memory in the counter side of which the count value CT is higher, so that the data D are recovered. Accordingly, even when the writing-back is stopped by the two controllers 41 and 42, at the power-on time, it is possible to write relatively correctly recovered data D in the first storage unit 131 of each of the RAMs 54 of the controllers 41 and 42.

In addition, the aforementioned embodiments may be modified as the following forms.

Figure 19:
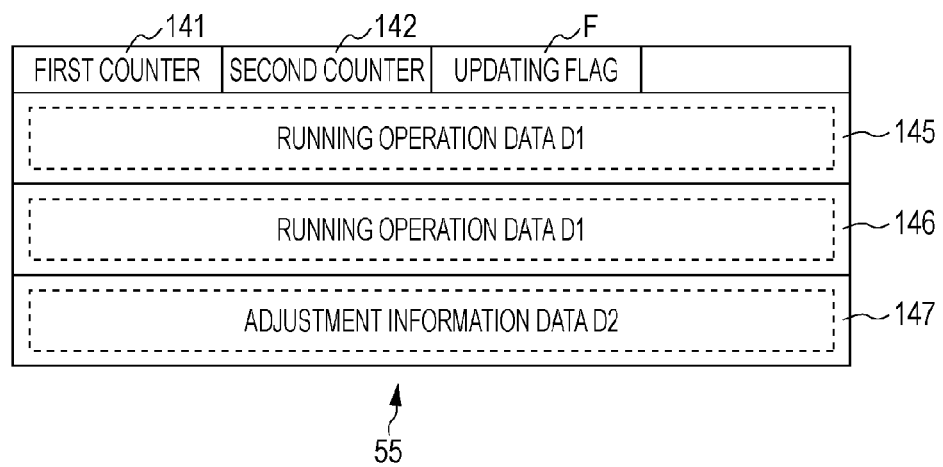
FIG. 19 is a schematic diagram illustrating a configuration of a non-volatile memory in a modified example.

A configuration where only a portion of the data D is written back to a plurality of the storage units may be employed. As illustrated in FIG. 19, the non-volatile memory 55 includes a first storage area 145 and a second storage area 146 as storage areas for storing the operation information data D1 among the data D and a third storage area 147 as a storage area for storing the adjustment information data D2. In the front area of the non-volatile memory 55, a first counter 141 for counting a data amount which is written back to the first storage area 145 and a second counter 142 for counting a data amount which is written back to the second storage area 146 are installed. Furthermore, the non-volatile memory 55 is provided with an updating flag F as identification information for identifying where the storage area of storing to-be-updated data among the first and second storage areas 145 and 146 is located. With respect to the operation information data D1, the writing-back site thereof is alternately switched, so that the writing-back of the operation information data D1 are alternately performed between the first storage area 145 and the second storage area 146. In addition, the adjustment information data D2 are always written back to the third storage area 147. According to the configuration, the storage area for storing the adjustment information data D2 among the data D is ended with one plane of the third storage area 147, so that it is possible to effectively utilize the storage capacity of the non-volatile memory 55. Accordingly, it is possible to secure much more capacity, which may be used for storing the data D, in the non-volatile memory 55. In addition, since the adjustment information data D2 are a type of information which is updated only at the time when the user operates the adjustment function of the printer 11, the adjustment information data D2 are not updated every operation of the printer 11, so that the updating frequency is very low. Accordingly, if the adjustment information data D2 are acquired from the host storage unit 120M, the adjustment information data D2 may be written in the RAM 54 similar to the normal time.

The timing of performing of the writing process by the writing task unit 91 is not limited to the power-on time (power-on time). The writing process may be performed periodically or non-periodically during the operation of the printer 11. In this configuration, the correct data of which the writing-back is completed may be written from the non-volatile memory 55 to the RAM 54.

The writing-back unit is not limited to the configuration where the writing-back site of the data is alternately written back. For example, the writing-back to the same storage unit among the storage units may be performed consecutively two or more times. In this case, the number of the consecutive writing-back times may be equal or different among the storage units. In short, if the writing-back timing is configured to be shifted, any configuration may be employed. In addition, it is preferable that the storage unit to which the writing-back is completed in the near position is specified by the updating flag F or the like.

The number of the storage units is not limited to two. A plurality of the storage units, for example, three or more storage units may be installed. In this case, the storage units of the writing-back site may be switched in a predetermined order. In addition, the storage units may be switched in a random order.

With respect to the data recovering process according to the second embodiment, the data D of which the writing-back is stopped, the information of the count value CT, and the like are transmitted from the printer 11 to the host apparatus 120, and the host control unit 125 may perform the data recovering process by using the received information and the data D of the host storage unit 120M. In addition, the recovered data D received from the host control unit 125 are configured to be written in the RAM 54.

When the count values CT of the counters 141, 142, 151, and 153 at the time when the writing task unit 91 (copying unit) is activated are central values (count values of neither the A value nor the B value) before reaching the writing-back completion value B and the writing-back is in progress, the data up to the writing-back finished position which may be recognized from the count value CT at that time may be copied from the first storage unit 131 into the second storage unit 132.

The writing-back process of the writing-back task unit 92 may be performed only at the power shutdown time.

At the power shutdown time, the writing-back process may be configured so that the count value CT of the counter is checked, and if the count value CT is the writing-back completion value B, the writing-back process may not be performed. According to the configuration, it is possible to easily avoid the stopping of the writing-back process at the accidental power shutdown time.

The data storage processing apparatus may be configured by using non-volatile memories as the storage devices 47 of the ink cartridges IC.

As an example of the counting unit, the counter may be changed into an appropriate number of bits. In short, when the writing-back process is stopped, the number of bits through which it may be determined up to which position the writing-back of the data D is completed may be employed. For example, the counter having an arbitrary number of bits among 2 to 7 bits may be employed. In addition, the number exceeding one byte may be employed. For example, the counter having 9 bits, 10 bits, or 2 bytes may also be employed.

The counting process of the counter as an example of the counting unit may be the decreasing of the count value. For example, the writing-back starting value A is set to the maximum value (for example, "255"), and the writing-back completion value B is set to the minimum value (for example, "0"), so that the writing-back process from the maximum value is stared and, as the writing-back process is progressing, the count value CT is decreased.

The writing-back completion value B is not limited to the maximum value "255" (B=255) or the minimum value "0" (B=0). The writing-back completion value B may be set to, for example, an intermediate value between the minimum value and maximum value. In short, a value through which the completion of the writing-back is determined may be sufficiently employed.

Although the counting process of the counters 141, 142, 151, and 153 is performed by using the data amount obtained by dividing the data size of the data D by 255 as one unit, the invention is not limited thereto. In other word, in the case of an N-bit counter, the division number of the maximum data capacity (data storage area) is not limited to "$2^G-1$", but a value less than "$2^G-1$" may be employed. For example, in the case of a 1-byte counter, 200 is used, and 201 to 255 may be used for a determination value for the different purpose or a count value for the different purpose.

At the copying process time, the counting process of the counter may also be performed so that the count value according to the copied data amount may be acquired.

The priority of the normal-time task unit is not limited to the order illustrated in FIG. 5A. For example, the priority of the writing-back task unit 92 may be set to be lower than those of the recording system task units 81 to 83 and 88 among the printing system task units 81 to 89, and to be higher than those of the other task units 84 to 87 among the printing system task units. In other words, the priority of the writing-back task unit 92 is set to be higher than those of the task units 84 to 87 of the command processing system (including the task units of the transport system and the carriage driving system) among the printing system task units. According to the configuration, the interrupt of the writing-back task unit 92 does not occur during the recording system process, and the delay of the recording system process does not easily occur. In addition, since the priority of the writing-back task unit 92 is higher than those of the task units 84 to 87, at an interval of the recording system process during the printing operation, the writing-back process of the data D may be performed prior to the process operations of the transport system or the carriage driving system. Accordingly, it is possible to suppress the deterioration in printing throughput and to increase writing-back frequency of the data D. As a result, it is possible to improve reliability of the data D of the non-volatile memory 55 at the power shutdown time, and it is possible to improve reliability of the recovered data at the data recovering time.

A monitoring unit (monitoring unit) for monitoring whether or not the data of the first storage unit 131 (mirror storage area) are updated is provided. Therefore, when a notice indicating the data updating is received from the monitoring unit, the writing-back task unit 92 is configured to be activated to perform the writing-back process of writing the data of the second storage unit 132 back to the non-volatile memory 55 if the counters 141, 142, 151, and 153 have the writing-back starting value A at that time. As another configuration, the aforementioned monitoring unit is configured to transmit a notice indicating the data updating to the writing task unit 91 (copying unit), and if the writing task unit 91 receives the notice indicating the updating, the copying process is configured to be started. Furthermore, if the copying process is completed, the writing task unit 91 may be configured to transmit a copying completion notice to the writing-back task unit 92, and if the writing-back task unit 92 receives the copying completion notice, the writing-back task unit 92 may be configured to be activated.

The writing task unit 91 may be replaced with a configuration having the data writing function and copying function; and the writing task unit (writing unit) for writing the data D of the non-volatile memory 55 in the first storage unit 131 and the copying task unit (copying unit) for copying the data D in the first storage unit 131 into the second storage unit 132 may be separately provided. In this case, the priorities of the writing task unit and the copying task unit may be set to be different.

The priority of the writing-back task unit may be changed. For example, the priority of the writing-back task may be configured to be lower than those of some task units included in the recording system task units and to be higher than those of some different task units included in the recording system task units. In this manner, the writing-back task unit is not limited to the configuration where the priority thereof is lower than those of all the task units included in the recording system task units, but in the recording system task unit is constructed with a plurality of the task units, a configuration where the priority of the writing-back task unit is lower than that of at least one of the task units included in the recording system task units may be sufficiently employed. In this case, since one task unit having higher priority is activated prior to the writing-back task unit, it is possible to easily avoid the delay of the recording system process. In addition, the priority of the writing-back task may be set to be between the priorities of the carriage driving system task and the transport driving system task.

When the printing control unit is constructed with a plurality of the task units, the priority of the copying unit is not necessarily higher than those of all the task units, but a configuration where the priority of the copying unit is higher than those of all the task units which perform the writing with respect to the first storage unit may be sufficiently employed. According to the configuration, it is possible to avoid a problem in that the original copying data of the first storage unit are rewritten by the task units constituting the printing control unit during the copying of the copying unit. For example, the priority of the writing task unit 91 (copying unit) is set to be higher than those of some task units which performs the writing access to the first storage unit among a plurality of the task units included in the printing system task units. According to the configuration, it is possible to avoid a problem in that the original copying data are rewritten during the copying.

At the power shutdown time, the priority of the writing-back task unit 92 may be set to be higher than that of the writing task unit 91. In this case, although the copying process may also be stopped, since the count value CT becomes the writing-back completion value B, the copying-stopped data is not written back, so that there is no problem. When the power is shutdown during the printing operation, although the data D are not the latest data, relatively new data D just before the start of the printing operation are stored in the non-volatile memory 55.

The activation priorities of the writing task unit 91 and the writing-back task unit 92 may be appropriately changed. For example, both of the priorities of the writing task unit 91 and the writing-back task unit 92 may be set to be lower than that of the recording system task unit or to be lower than that of the printing system task unit. Furthermore, for example, both of the priorities of the writing task unit 91 and the writing-back task unit 92 may be set to be higher than that of the recording system task unit or to be higher than that of the printing system task unit.

The writing task unit 91 (copying unit) is not limited to the configuration of starting copying by using the writing-back completion notice as a trigger. For example, if a writing-back unit (the writing-back task unit 92) is activated, a copying request is transmitted to the writing task unit 91 (copying unit). If the writing task unit 91 receives the copying request, the writing task unit 91 starts the copying process. If the writing task unit 91 finishes copying and the printer 11 is in the standby status, the writing-back task unit 92 is activated again. At the re-activation time, the writing-back task unit 92 writes the data D in the second storage unit 132 back to the non-volatile memory 55. According to this configuration, just after the latest data are copied, it is possible to perform the writing-back. In the method according to the aforementioned embodiment, at the first time in which the printing is finished and the printer is in the standby status, since the data D in the first storage unit 131 become old data which are copied before the start of the printing, the writing-back of the old data is performed through the first writing-back. On the contrary, according to the method in this modified example, the writing-back of the latest data may be performed through the first writing-back.

The OS is not limited to the real-time OS. A different OS may be employed. In short, an OS having a function of allocating a CPU execution right to a task having a higher priority among a plurality of tasks may be employed.

A configuration where the task priority is not changed at the power-off time may be employed. For example, an urgent task unit which is preferentially activated at the power-off time may perform the writing-back process.

The data storage processing apparatus may be configured with hardware, for example, using an integrated circuit such as ASIC instead of software executed by the CPU. In addition, the data storage processing apparatus may be configured as a combination of software and hardware. In addition, in the case of the software configuration, it is not limited to a multitasking process.

In the aforementioned embodiments, the second storage unit may be configured as the non-volatile memory. For example, the configuration where, while the printer is operated, the sequential writing of the updating data in the non-volatile memory (second writing unit) of the printer main body side and the writing-back of the data of the non-volatile memory to the non-volatile storage device 47 (first storage unit) mounted on the ink cartridge may also be employed. For example, at the power-on time, the data D including the ink-associated information such as the ink remaining amount from the storage devices 47 are configured to be written in the non-volatile memory of the main body side.

The control unit C may have a configuration where the controller 40 and the mechanical controller 43 are integrated. In this case, a task unit of a mechanical driving control system such as a transport control task unit or a carriage control task unit is added to the controller. The transport control task unit is configured as an example of a transport control unit.

The printing medium is not limited to a long sheet made of a paper, a resin, or the like, but a single sheet paper or a single-sheet-shaped resin film may be employed. In addition, a metal film, a cloth, a film substrate, a resin substrate, a semiconductor wafer, or the like may be employed. In addition, an optical disc such as a CD or a DVD, a magnetic disc, or the like may also be employed. In addition, the printing medium is not limited to a sheet shape. In the case of a printing apparatus having a mechanism capable of printing on a surface having a predetermined three-dimensional shape, the printing medium also includes an object having the predetermined three-dimensional shape.

The printing apparatus is not limited to the lateral type printer 11, but a serial printer, a line printer, or a page printer may be employed. Furthermore, the printing apparatus is not limited to an ink jet type, but a dot impact type printer, a laser printer, or the like may be employed.

In the aforementioned embodiments, although the ink jet type printer 11 is employed as the printing apparatus, a fluid ejecting apparatus which sprays or ejects a fluid other than ink may be employed. In addition, various liquid ejecting apparatuses having liquid ejection heads or the like for ejecting a minutely small amount of liquid droplets may be used. In this case, the liquid droplet denotes a state of a liquid ejected from the aforementioned liquid ejecting apparatuses and also includes liquid droplets leaving a tail in a granular state, a tear-like state, and a thread-like state. In addition, the liquid referred herein may be a material which may be ejected by the liquid ejecting apparatuses. For example, a material in a liquid state may be used. In addition, a liquid state having a high or low viscosity, a sol solution, a gel water, other fluid state such as inorganic solvents, organic solvents, solutions, liquid resins, and liquid metals (metal solution) may be included. In addition, a material where particles of a functional material made of a solid material such as pigments or metal particles are dissolved into a solvent, dispersed, or mixed as well as a liquid as a one-state material may be included. In addition, as a representative example of the liquid, there may be an ink, a liquid crystal, or the like described in the aforementioned embodiments. Herein, the ink may include general water-based ink and oil-based ink and various types of liquid compounds such as a gel ink and a hot-melt ink. As an detailed example of the liquid ejecting apparatus, there may be, for example, a liquid crystal display, an EL (electroluminescence) display, a surface emission display, a liquid ejecting apparatus which ejects a liquid including a material such as an electrode material or a coloring material used for manufacturing a color filter or the like in a dispersed or dissolved manner, or the like. In addition, a liquid ejecting apparatus which ejects a bio organic material used for manufacturing a bio chip, a liquid ejecting apparatus which ejects a liquid which becomes a specimen used as a precision pipette, a textile printing apparatus, a micro dispenser, or the like may be employed. In addition, a liquid ejecting apparatus which ejects a lubricant in a precision machine such as a watch or a camera by using a pin point, a liquid ejecting apparatus which ejects a transparent resin solution such as a UV cured resin on a substrate so as to form a hemispherical micro lens (optical lens) or the like used for an optical communication device or the like, a liquid ejecting apparatus which ejects an etchant such as an acid etchant or an alkali etchant so as to etch a substrate or the like may be employed. In addition, the invention may be adapted to any types of the liquid ejecting apparatus. In addition, the fluid may be a granular material such as toner. In addition, the fluid referred in this specification does not include a material constructed with only gas.

What is claimed is:

1. A data storage processing apparatus in a printing apparatus, comprising:
   a printing control unit which controls the printing unit and acquires printing-associated information updated through an operation of the printing unit;
   a first storage unit which is a non-volatile storage unit including a first storage area and a second storage area in which data including the printing-associated information are stored;
   a second storage unit in which the data of one of the first storage area and the second storage area are written;
   a writing unit which writes the data of one of the first storage area and the second storage area to the second storage unit;
   a first counting unit and a second counting unit which are disposed to correspond to the first storage area and the second storage area; and
   a writing-back unit which performs a writing-back process for writing the data of the second storage unit back to one of the first storage area and the second storage area and performs counting processes of the counting units corresponding to the first storage area and the second storage area which are writing-back sites on which the writing-back process is performed to set a count value according to an amount of the written-back data,
   wherein the writing unit writes the data of one of the first storage area and the second storage area corresponding to the counting unit, of which the count value becomes a writing-back completion value to the second storage unit.

2. The data storage processing apparatus in a printing apparatus according to claim 1,
wherein the writing unit is activated at least at the time where the printing apparatus is powered on.

3. A printing apparatus comprising:
a printing unit; and
a control unit which controls the printing unit,
wherein the control unit includes the data storage processing apparatus according to claim 2.

4. The data storage processing apparatus in a printing apparatus according to claim 1,
wherein the writing-back unit performs the writing-back process by delaying a writing-back timing of the time when the data of the second storage unit are written back to one of the first storage area and the second storage area.

5. A printing apparatus comprising:
a printing unit; and
a control unit which controls the printing unit,
wherein the control unit includes the data storage processing apparatus according to claim 4.

6. The data storage processing apparatus in a printing apparatus according to claim 1,
wherein the writing-back unit sequentially switches the first storage area and the second storage area which are set as the writing-back sites of the data of the second storage unit.

7. The data storage processing apparatus in a printing apparatus according to claim 6,
wherein the writing-back unit stores identification information capable of identifying one storage area which performs data writing-back in the nearest position in the first storage area and the second storage area, and
wherein the writing unit writes data of the one storage area identified based on the identification information to the second storage unit.

8. A printing apparatus comprising:
a printing unit; and
a control unit which controls the printing unit,
wherein the control unit includes the data storage processing apparatus according to claim 7.

9. The data storage processing apparatus in a printing apparatus according to claim 6,
wherein in the case where it is determined that all the count values of the plurality of counting units are not writing-back completion values, the writing unit further includes a recovering unit which recovers the data by using a portion of the data up to the amount which corresponds to the count value of the corresponding counting unit in the data of the first storage area and the second storage area.

10. A printing apparatus comprising:
a printing unit; and
a control unit which controls the printing unit,
wherein the control unit includes the data storage processing apparatus according to claim 9.

11. The data storage processing apparatus in a printing apparatus according to claim 6,
wherein in the case where it is determined that all the count values of the plurality of counting units are not writing-back completion values, the writing unit transmits at least a portion of the data up to the amount which corresponds to the count value of the corresponding counting unit in the data of the first storage area and the second storage area to a higher-level apparatus which is communicably connected to a printing apparatus and writes data which are recovered by the higher-level apparatus and received from the higher-level apparatus in the second storage unit.

12. A printing apparatus comprising:
a printing unit; and
a control unit which controls the printing unit,
wherein the control unit includes the data storage processing apparatus according to claim 11.

13. A printing apparatus comprising:
a printing unit; and
a control unit which controls the printing unit,
wherein the control unit includes the data storage processing apparatus according to claim 6.

14. The data storage processing apparatus in a printing apparatus according to claim 1,
wherein the printing control unit updates the data of the second storage unit by writing the acquired printing-associated information in the second storage unit,
wherein the writing-back unit performs the writing-back process for writing the data of the second storage unit back to one of the first storage area and the second storage area and performs the counting process of the counting unit corresponding to the first storage area and the second storage area to set the count value according to an amount of the written-back data, and
wherein in the case where all the count values of the counting unit become writing-back completion values, the writing unit writes the data of one of the first storage area and the second storage area corresponding to the counting unit of which the count values become writing-back completion values in the second storage unit; and in the case where at least one of the count values of the counting unit becomes a writing-back completion value and at least another does not become a writing-back completion value, the writing unit writes the data of one of the first storage area and the second storage area corresponding to the counting unit of which the count value becomes the writing-back completion value to one of the first storage area and the second storage area corresponding to the counting unit of which the count value does not become a writing-back completion value.

15. A printing apparatus comprising:
a printing unit; and
a control unit which controls the printing unit,
wherein the control unit includes the data storage processing apparatus according to claim 14.

16. The data storage processing apparatus in a printing apparatus according to claim 1,
wherein the printing control unit acquires, as the printing-associated information, operation information updated according to a printing operation of the printing unit and setting information updated at the time when a setting operation is performed according to an instruction of a user, and
wherein the writing-back unit writes the operation information among the data of the second storage unit back to one of the first storage area and the second storage area and sequentially switches the first storage area and the second storage area of the writing-back sites of the operation information by writing the setting information back to a predetermined storage area in the first storage unit other than the first storage area and the second storage area.

17. A printing apparatus comprising:
a printing unit; and
a control unit which controls the printing unit, wherein the control unit includes the data storage processing apparatus according to claim 16.

18. A printing apparatus comprising:
a printing unit; and
a control unit which controls the printing unit,
wherein the control unit includes the data storage processing apparatus according to claim 1.

19. A data storage processing method of a printing apparatus,
wherein the printing apparatus includes:
a first storage unit including a plurality of storage units which store data including printing-associated information; and
a second storage unit which permits a printing control unit to perform writing access of the data in order to write data of the storage units of the first storage unit and to update the data,
wherein the data storage processing method comprises:
writing the data of the plurality of storage units of a first writing unit to the second storage unit;
controlling a printing unit and acquiring the printing-associated information which is updated through an operation of the printing unit;
updating data by writing the printing-associated information, which is acquired in the acquiring the printing-associated information, in the second storage unit; and
performing a writing-back process of writing the data of the second storage unit back to the plurality of storage units of the first unit and obtaining count values according to the written-back data amount by performing a counting process of a counting unit corresponding to each storage unit of the first storage unit which is a writing-back site on which the writing-back process is performed, and
wherein, in the writing of the data of the plurality of storage units of the first writing unit to the second storage unit, determining whether or not a count value is a writing-back completion value and writing data of the storage unit of the first storage unit corresponding to the counting unit, of which the count value becomes the writing-back completion value among a plurality of the counting units, to the second storage unit.

20. A data storage processing method of a printing apparatus including a first storage unit including a plurality of storage units which store data including printing-associated information and a second storage unit which permits a printing control unit to perform writing access of the data in order to write data of the storage units and to update the data, the method comprising:
writing the data of the plurality of storage units of a first writing unit in the second storage unit;
controlling a printing unit and acquiring the printing-associated information which is updated through an operation of the printing unit;
updating data by writing the printing-associated information acquired in the acquiring the printing-associated information in the second storage unit; and
performing a writing-back process of writing the data of the second storage unit back to the plurality of storage units and obtaining count values according to the written-back data amount by performing a counting process of a counting unit corresponding to the storage unit of a writing-back site on which the writing-back process is performed
wherein performing the writing-back process includes sequentially switching the storage units which are set as the writing-back sites of the data of the second storage unit among the plurality of storage units, and
wherein, in the writing of the data of the plurality of storage units of the first writing unit in the second storage unit, determining whether or not a count value is a writing-back completion value and writing data of the storage unit corresponding to the counting unit, of which the count value becomes the writing-back completion value among a plurality of the counting units, in the second storage unit.

\* \* \* \* \*